United States Patent
Joege et al.

(10) Patent No.: US 11,344,856 B2
(45) Date of Patent: May 31, 2022

(54) MODULAR PRODUCTION SYSTEM AND METHOD FOR PRODUCING FORMULATIONS

(71) Applicant: BASF COATINGS GMBH, Münster (DE)

(72) Inventors: Frank Joege, Münster (DE); Bernhard Hueser, Münster (DE); Ralf Berg, Münster (DE); Stefan Groetsch, Münster (DE); Jeremy Fouillet, Münster (DE); Michael Kolbe, Münster (DE); Jan Berg, Münster (DE)

(73) Assignee: BASF COATINGS GMBH, Münster (DE)

( * ) Notice: Subject to any disclaimer, the term of this patent is extended or adjusted under 35 U.S.C. 154(b) by 188 days.

(21) Appl. No.: 16/614,690

(22) PCT Filed: May 2, 2018

(86) PCT No.: PCT/EP2018/061136
§ 371 (c)(1),
(2) Date: Nov. 18, 2019

(87) PCT Pub. No.: WO2018/210559
PCT Pub. Date: Nov. 22, 2018

(65) Prior Publication Data
US 2020/0094206 A1  Mar. 26, 2020

(30) Foreign Application Priority Data

May 19, 2017 (EP) ..................................... 17171923

(51) Int. Cl.
*B01F 33/80* (2022.01)
*B65G 63/00* (2006.01)
*B01F 101/30* (2022.01)

(52) U.S. Cl.
CPC .......... *B01F 33/8051* (2022.01); *B65G 63/00* (2013.01); *B01F 2101/30* (2022.01)

(58) Field of Classification Search
CPC ........... B01F 13/1005; B01F 2215/005; B01F 15/00285; B01F 15/0022; B01F 15/00233; B01F 15/00246; B01F 15/00214; B01F 33/8051; B01F 35/2131; B01F 35/2132; B01F 35/2134; B01F 35/2136; B01F 35/2202; B65G 63/00; B29B 7/28; B29B 7/94; B29B 7/7461; B29B 7/244
See application file for complete search history.

(56) References Cited

U.S. PATENT DOCUMENTS

| | | | | |
|---|---|---|---|---|
| 3,670,785 A | * | 6/1972 | Heiss | B01F 13/1055 141/9 |
| 4,525,071 A | * | 6/1985 | Horowitz | B01F 13/1069 366/141 |
| 5,083,591 A | * | 1/1992 | Edwards | B01F 15/00428 141/9 |
| 5,163,484 A | * | 11/1992 | Howlett | B01F 13/1055 141/103 |
| 5,203,387 A | * | 4/1993 | Howlett | B01F 13/1055 141/102 |
| 5,268,849 A | * | 12/1993 | Howlett | B01F 13/1055 141/103 |
| 6,418,958 B1 | | 7/2002 | Rossi et al. | |
| 10,843,150 B1 | * | 11/2020 | Ong | B01F 15/00253 |
| 2010/0017312 A1 | | 1/2010 | Martin | |
| 2020/0070112 A1 | * | 3/2020 | Darmstaedter | B29B 7/16 |
| 2020/0094206 A1 | * | 3/2020 | Joege | B29B 7/94 |
| 2020/0179887 A1 | * | 6/2020 | Joege | B29B 7/28 |
| 2021/0146323 A1 | * | 5/2021 | Joege | G05D 11/137 |

FOREIGN PATENT DOCUMENTS

| | | | | |
|---|---|---|---|---|
| CN | 1500236 A | 5/2004 | | |
| CN | 102159673 A | 8/2011 | | |
| CN | 102441337 A | 5/2012 | | |
| CN | 202490593 U | 10/2012 | | |
| EP | 2821128 A1 * | 1/2015 | .......... | B01F 13/1069 |
| EP | 3085437 A1 * | 10/2016 | .......... | B01F 13/1066 |
| EP | 3244174 A2 * | 11/2017 | .............. | B29B 7/28 |
| EP | 3244174 A2 | 11/2017 | | |
| WO | 9941003 A1 | 8/1999 | | |
| WO | 02075285 A2 | 9/2002 | | |
| WO | 2004081685 A1 | 9/2004 | | |
| WO | 2013081812 A1 | 6/2013 | | |
| WO | 2018210560 A1 | 11/2018 | | |
| WO | 2018210562 A1 | 11/2018 | | |
| WO | 2018211011 A1 | 11/2018 | | |
| WO | WO-2018211011 A1 * | 11/2018 | ........ | B01F 15/00233 |

OTHER PUBLICATIONS

English Translation of International Search Report for International Patent Application No. PCT/EP2018/061136, dated Jul. 13, 2018, 2 pages.
European Search Report for EP Patent Application No. 17171923.0, dated Nov. 28, 2017, 3 pages.

* cited by examiner

*Primary Examiner* — Charles Cooley
(74) *Attorney, Agent, or Firm* — Armstrong Teasdale LLP

(57) ABSTRACT

Described herein is a modular production system for the production of formulations, the module production system including a first unit for the production of formulations and a second unit for the receipt and removal from storage of piece goods and loading units and for the provision of piece goods. Also described herein is a process for producing formulations using the modular production system.

18 Claims, 3 Drawing Sheets

MODULAR PRODUCTION SYSTEM AND METHOD FOR PRODUCING FORMULATIONS

CROSS-REFERENCE TO RELATED APPLICATIONS

This application is a U.S. National Phase Application of International Patent Application No. PCT/EP2018/061136, filed May 2, 2018, which claims the benefit of priority to EP Patent Application No. 17171923.0, filed May 19, 2017, the entire contents of which are hereby incorporated by reference herein.

FIELD OF THE INVENTION

The present invention relates to a new modular production system for formulations. Moreover, the present invention relates to a process for producing formulations, for example coatings, using the modular production system.

BACKGROUND

Formulations, i.e., more or less complex multicomponent systems, and the production thereof are a central component of a wide variety of different industrial sectors. Examples include the coatings industry, the food industry or also the medical industry. Relevant formulations are produced by physical mixing of fluid (flowable) and solid substances (raw materials). Generally, the solids required for production (e.g., pigments and fillers in the coatings industry) are transferred to a fluid form (pastes, ground materials) in upstream steps and then used in the form of these intermediates in the actual production. Likewise often used in production in the form of such intermediates are premixed raw materials such as resins, solvents and additives (as mixing coats).

The wide range of products, i.e., formulations, to be produced in industrial production is frequently associated with a likewise enormous complexity of raw materials and intermediates to be used (also jointly called input materials for the production of formulations). Typical magnitudes, for example in the area of production of automotive coatings, are in the range of about 100 to 1000 input materials and sometimes over 1000 products (ready coatings and also complete components of coatings, especially base and hardener components in two-component coatings) in various product families (primers, fillers, base coats, clear coats, and so on). The consequence of this is that many products are only produced irregularly, in small quantities and as piece goods. The input materials, too, are consequently used as piece goods to a large extent.

To counter the complexity concerning the input materials, there are various approaches in the prior art of converting the still common form of batch production to a continuous or semicontinuous production process, where the input materials, for example, are metered in via a main line and already premixed therein or else are directly added to a mixing device via individual feed lines. This involves providing a wide variety of different measuring devices for the setting of the required mass flow rates of the input materials in order to obtain a product within specification and for the continuous quality control of the product to be produced, said measuring devices capturing on the wet material important characteristic values of the product such as viscosity, pH or else color during the production process. Formulation material which is produced in this context and which is out of specification is discarded or is complicatedly gradually metered into the main stream of the input materials and/or into the mixing device again via circulation line systems and blended therein with the material to be produced after setting of the correct production parameters to give a product still within specification. The continuously or semicontinuously produced formulation is then transferred to particular loading units (items of packaging for shipment) via appropriate filling lines and shipped as piece good.

Relevant concepts and/or measuring devices, especially for the wet-chemical measurement of the color properties of coatings such as automotive coatings, are described in WO 2013/081812 A1, WO 99/41003 A1, WO 2004/081685 A1 or WO02/075285 A2.

It is possible in the manner described to at least succeed in simplifying or more efficiently configuring the actual production of formulations, especially coatings.

However, the known concepts overlook the fact that it is not only complexity in the production of a particular formulation which is a core challenge.

It is much more difficult to additionally adequately cope with the production of a wide variety of different formulations with a wide variety of different properties and many different input materials, said production being desired in industrial production.

Account should be taken here of the production-associated relevance of specific transport of the input materials required for production (of which a large proportion are likewise piece goods) from a central holding unit to transfer points at the production site. Also relevant is the controlled placement of the input materials into storage at the holding unit. In many sectors, especially in the coatings production sector, it is additionally necessary to pretreat different input materials in a specific manner prior to use (homogenization by shaking, agitation and/or rocking, and heating). It is likewise important in this connection to clearly label the products arising as piece goods (after filling into appropriate items of delivery packaging), to place them into storage until dispatch to a customer, and, in the event of a dispatch order, to convey them in a specific manner to an appropriate storage-removal point for the purposes of loading.

BRIEF DESCRIPTION

The problem addressed by the present invention was that of providing a system which not only allows the industrial production of different formulations, but also addresses the issue of the effective organization of holding, provision, receipt and removal from storage of the input materials and products that arise as piece goods to a great extent. In this connection, the system should be designed such that it, firstly, allows the controlled receipt and also the specific and production-schedule-determined conveyance of input materials arising as piece goods from a holding unit to the production site, and, secondly, ensures an appropriately controlled transport of the produced products from the production site to a receiving unit and also the controlled placement into storage or temporary storage of said products and also their removal from storage.

What was found was a new modular production system for formulations, comprising
(1) a unit for the production and drawing-off of formulations and also
(2) a unit coupled to unit (1) for the receipt and removal from storage of piece goods (S) and loading units (L) and for the provision of piece goods (S), comprising (2.1) a subunit for the holding of empty loading units (L) and of loading units (L) filled with piece goods, (2.2) a receiving subunit for the receipt of empty loading units (L) and of loading units (L) filled with piece goods, (2.3) a storage-removal subunit for the removal from storage of empty loading units (L) and of loading units (L) filled with piece goods, and also (2.4) a provision subunit for the provision of piece goods (S) for the production of formulations, the provision unit having devices (V), the devices (V) comprising (V.1) means for the automated docking of standardized loading units (sL), (V.2) means for the automated withdrawal of defined quantities of piece goods present in the standardized loading units (sL) and (V.3) means for the transfer of the defined quantities from (V.2) to the unit (1), the unit (2) additionally comprising means (M) for the automated transport of loading units within and between units and subunits of the production system.

The new modular production system is subsequently also referred to as production system according to the invention and is thus subject matter of the present invention. Preferred designs and further subjects of the present invention can be gathered from the following description and from the dependent claims.

The new modular production system ensures an effective and semiautomated or fully automated organization of the handling of input materials and products that arise as piece goods and of corresponding loading units which have been filled or are to be filled with the piece goods. In particular, what is ensured is that the feeding, holding and provision, removal from storage and optionally pretreatment of piece goods and loading units is done at the right place at the right time within a complex production system, this allowing a hugely effective production process—starting from the feeding of the input materials up to the removal of products from storage.

DETAILED DESCRIPTION

Production System

Figure 1:
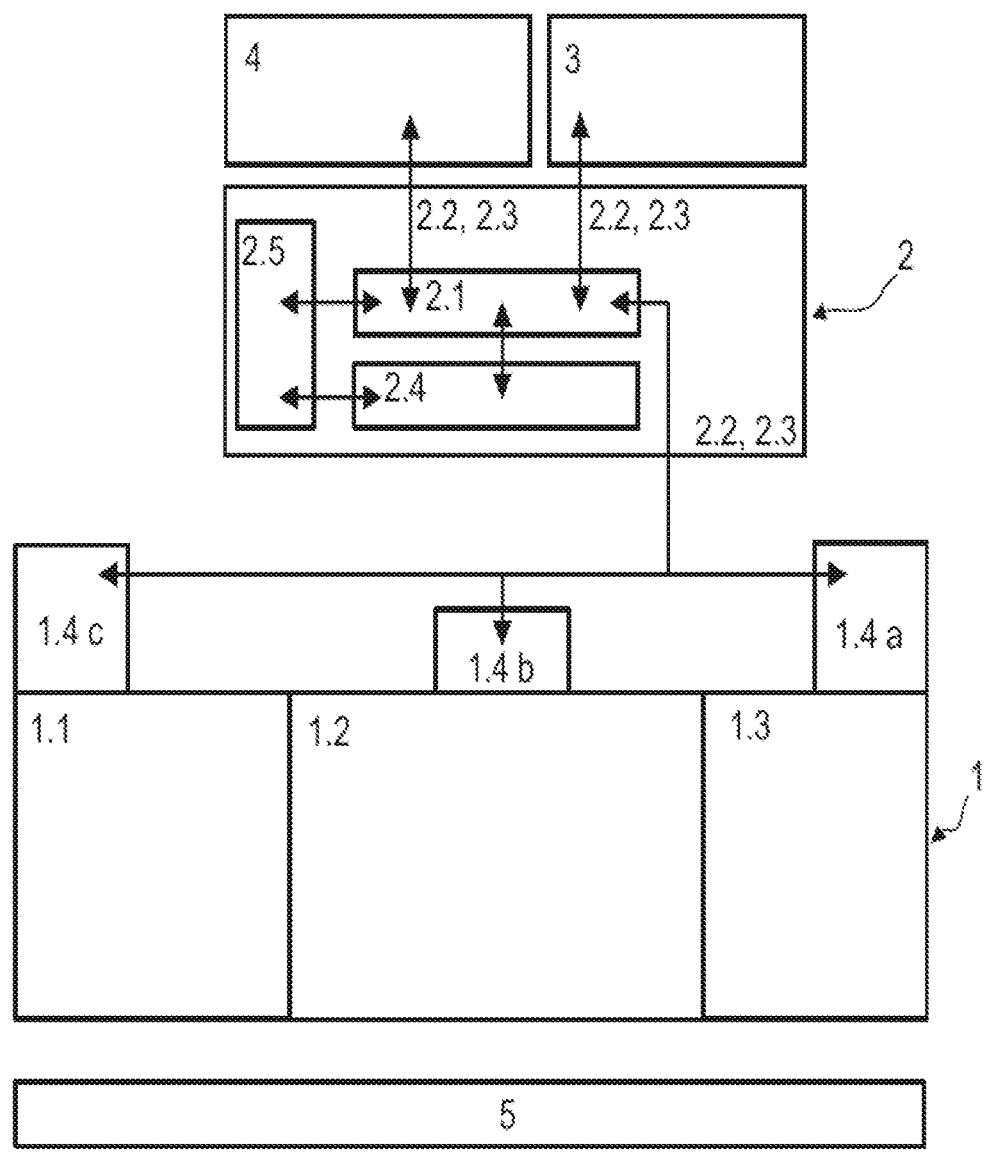
FIG. 1 is a schematic illustration of a production system in accordance with the present disclosure.

The production system according to the invention is a modular system. It thus consists of multiple modules or units, especially a unit (1) for the production and drawing-off of formulations and also a unit (2) coupled to unit (1) for the receipt and removal from storage of piece goods (S) and loading units (L) and for the provision of piece goods (S).

In this connection, the term module or unit or subunit describes, according to the invention, the delimitable properties and individual functions of the particular module or of the particular unit or subunit. It is not necessary for two units to be clearly spatially or physically separated from one another and/or for one unit to be a spatially and/or physically individualized zone in its own right. For example, a provision subunit can comprise many different zones in which the devices (V) are arranged. Said zones can, in each case, lie directly next to one another or on top of one another. Equally, they can, however, also be completely or partially spatially separated from one another, and in this case, for example, other zones, units or parts of units of the production system are arranged in corresponding separation zones.

The modular production system according to the invention comprises first of all a unit (1) for the production and drawing-off of formulations, preferably fluid formulations. The expression "unit for the production and drawing-off of formulations" evidently means that the unit must be suitable for the production and drawing-off of formulations. In this case, it is fundamentally possible to conceive first of all any form known to a person skilled in the art of the production and drawing-off unit. The sole predetermined criterion which must be observed is that the unit (1) must comprise means which make it possible to receive the defined quantities of piece goods for the production of formulations that are transferred from unit (2) in an automated manner (see also feature (V.3) which is elucidated further below and which implicitly gives rise to the feature of the unit (1) that is mentioned in the opening sentence).

Piece goods (S) for the production of formulations can be equated with raw materials and intermediates that arise as piece goods (S).

It is preferred that the unit (1) is additionally suitable for producing and drawing off any form of fluid intermediates. This applies both to intermediates produced from solid and fluid raw materials and to intermediates produced from only fluid raw materials. This equally applies to intermediates produced from previously produced intermediates or from previously produced intermediates and solid and/or fluid raw materials. The unit (1) is thus preferably suitable for producing, for example, pigment pastes and mixing coats. Said pigment pastes and mixing coats can then in turn be used as input material for the production of formulations (i.e., products).

Further preferred embodiments of the unit (1) are described further below.

Unit (2)

The modular production system according to the invention additionally comprises a unit (2) coupled to unit (1) for the receipt and removal from storage of piece goods (S) and loading units (L) and for the provision of piece goods (S).

The wording "unit for the receipt and removal from storage of piece goods (S) and loading units (L) and for the provision of piece goods (S)" evidently means that the unit must be suitable for the receipt and removal from storage of piece goods (S) and loading units (L) and for the provision of piece goods (S).

The unit (2) is coupled to the unit (1). The two units are thus in contact with one another and are connected to one another. This connection is at least, but not absolutely exclusively, in the form of the means described in more detail further below (V.3), i.e., means for the transfer of defined quantities of piece goods to the unit (1).

The unit (2) comprises first of all a subunit (2.1) for the holding of empty loading units (L) and of loading units (L) filled with piece goods.

In the context of the present invention, the wording "holding" is to be understood as follows, especially also in contrast to the term provision. Whereas "provision" of a component means, from a temporal and physical perspective, directly and immediately making said component available, "holding" of a component means the short-term storage of said component, said storage being effected in preparation and expectation of the necessary provision. Said short-term storage then takes place at a position from which the component can be transported to the location of provision in a simple manner. In particular, it is fundamentally not envisaged to store the component at the location of holding in the longer term, as occurs for example in storage facilities intended for this purpose. Short-term storage in the context of holding is to be understood here to mean in particular storage of up to 48 hours, calculated from the receipt of a component in the subunit (2.1) up to the use or first use. The designation first use refers to standardized loading units (sL) which are described in more detail further below and which have been filled with input materials, i.e., raw materials or intermediates, and from which only a portion of the input material is withdrawn as part of the first use. For this reason, the then part-emptied loading unit is transported back again to its position in the holding unit (2.1) and held until the next use.

The empty loading units (L) can, for example, be disposable items of delivery packaging and reusable items of delivery packaging which are held in order to be able to convey them, as required, in a manual or automated manner through the below-described storage-removal unit to the unit (1), where produced formulations can be drawn off. Appropriate empty reusable items of delivery packaging are evidently preferably cleaned before the receipt and holding in unit (2).

Loading units (L) filled with piece goods (S) can be disposable items of delivery packaging and reusable items of delivery packaging which have been filled in the unit (1) with products (formulations) produced in said unit, have been received in the unit (2) via the below-described subunit (2.2), and are then to be held until removal from storage via the below-described subunit (2.3) for placement into storage in a storage facility for longer-term storage or for direct shipment to a customer.

Loading units (L) filled with piece goods (S) can in particular also be raw materials supplied by raw material suppliers in particular loading units (original containers filled with raw materials). Such loading units are, for example, held in order to allow a required refilling into standardized loading units (sL). Equally, they can thus be standardized loading units (sL), as described in more detail further below, which have been filled with input materials, i.e., raw materials or intermediates. Such filling with raw materials preferably takes place in the preferred module (3), as described further below, for the refilling of raw materials from original containers into standardized loading units (sL). Such filling with intermediates preferably takes place in the unit (1), which, as described above, is preferably also suitable for the production of intermediates. The holding of these components then allows the required provision of the components for production via the subunit 2.4.

Consequently, the empty loading units (L) can, for example, also be emptied original containers which, for example, are to be received from the module (3) in order to be outwardly transferred from the entire system (i.e., the modular production system) via the module (2), though no direct outward transfer can take place owing to other high-priority processes. In particular, however, they can also be standardized loading units (sL) which are to be held in order to be filled with raw materials and/or intermediates. Appropriate empty loading units (sL) are evidently preferably cleaned before the receipt and holding in unit (2).

The unit (2.1) preferably serves for the holding of empty loading units (L) and of loading units (L) filled with piece goods (S), this encompassing at least, but not absolutely exclusively, (i) empty disposable items of delivery packaging and reusable items of delivery packaging,
(ii) disposable items of delivery packaging and reusable items of delivery packaging filled with formulations,
(iii) original containers filled with raw materials,
(iv) standardized loading units (sL) filled with raw materials,
(v) standardized loading units (sL) filled with intermediates, and
(vi) empty cleaned standardized loading units (sL).

The subunit (2.1) can, for example, be designed as a central unit, preferably in the form of a high-rack system. Such high-rack storage systems are known in industrial production and logistics. In particular, they can be constructed so as to be very tall and thus save space, for example from above 5 meters right up to meters in height. There can be hundreds or even thousands of positions for the holding of components or of empty loading units (L) and of loading units (L) filled with piece goods (S). In this connection, the aforementioned components can also be held on pallets. Generally, such high-rack storage systems consist of steel constructions which are arranged within a self-supporting building or are themselves the supporting structure within a building. Between the individual racks or rack units there are generally corridors, by means of which especially the means (M) described further below have a possibility of access to the holding positions.

The unit (2) is suitable for the receipt and removal from storage of piece goods (S) and loading units (L), i.e., has means which allow an appropriate receipt and removal from storage.

Piece goods (S) are to be understood to mean first of all, according to the established definition, all types of goods which have been packaged in a loading unit in a dimensionally stable manner to the extent that they can be treated as a conveyance unit in transport or storage processes. Said conveyance units (as quantities) are, especially when contrasted with bulk goods, comparatively small and are, for example, in the range from just a few kilograms up to at most a few tonnes. The reason for the smaller size of the individual conveyance units is especially the comparatively low demand, which is in some cases only irregular in large production plants.

Relevant as piece goods (S) in connection with the present invention are input materials for the production of formulations and also produced formulations (i.e., products).

A possible group of input materials, also called raw materials in the narrower sense, are, for example, physically curable, thermally curable and/or actinic-radiation-curable resins as binders, appropriate crosslinking agents, specific organic solvents, reactive diluents, coloring and/or effect-giving or transparent pigments, fillers, molecularly dispersely soluble dyes, nanoparticles, and also additives such as light stabilizers, antioxidants, deaerating agents, emulsifiers, slip additives, polymerization inhibitors, polymerization initiators, adhesion promoters, leveling agents, film-forming aids, sag control agents (SCAB), flame retardants, corrosion inhibitors, waxes, siccatives, biocides and matting agents.

A likewise possible group of input materials, also called intermediates in the narrower sense, are those which are produced from at least two raw materials as described above and are then used as input materials for the production of formulations. Examples include pigment pastes and filler pastes which are produced by mixing of (solid) pigments and/or fillers with resin components and solvents such as water or organic solvents. Mixtures of pigments and/or fillers which are solid as such are also possible. A further example are pigment-free and filler-free mixing coats in which different raw materials such as resins as binders, solvents and different additives are present mixed together.

Raw materials and intermediates that arise as piece goods (S) can also be referred to as piece goods (S) for the production of formulations.

The raw materials and intermediates as described in more detail above, i.e., input materials for the production of formulations, are especially those which are used for the production of coatings such as, for example, automotive coatings. Correspondingly preferred formulations, i.e., products, in the context of the present invention are thus coatings such as, in particular, automotive coatings. However, formulations from other industrial sectors such as, for example, the food industry or the medical industry are equally encompassed.

Appropriate input materials and products as piece goods can be solid or fluid (flowable). In the context of the present invention, the solid or fluid (flowable) state is based on, in each case, a temperature of 20° C., standard pressure (1013.25 hPa) and a shear stress of 1000 s$^{-1}$ for one minute, unless otherwise specified. If a component has a viscosity of not more than 10 000 mPas (e.g., measured using the instrument Rheomat RM 180 from Mettler-Toledo) under these conditions, it is fundamentally referred to as fluid.

Conceivable as input materials are, in particular, solid raw materials (e.g., pigments, fillers) and fluid raw materials (e.g., resins as binders, organic solvents) and also fluid intermediates (e.g., pigment pastes, mixing coats). In the context of the present inventions, fluid products are preferred as products (formulations), since especially those are producible by means of the modular production system.

It is self-evidently also possible for, for example, raw materials and intermediates which are to be used for the production of formulations and cannot be referred to as fluid under the above-described fundamental conditions to be pretreated such that they can be used, per the definition given here, as fluid input material (viscosity of not more than 10 000 mPas). Such a pretreatment then takes place in the pretreatment unit described further below. For example, this can involve heating an input material in order to lower its viscosity. Equally, a, for example, thixotropic input material can be rotated, agitated, rocked or shaken for a particular duration in order to achieve a decrease in viscosity.

Loading units (L) in a very general sense are to be understood to mean, according to the established definition, items of packaging for the accommodation of goods, such as boxes, drums, containers, sacks and any further conceivable and available receptacles, for example the standardized loading units (sL) mentioned further below.

The unit (2) comprises a receiving subunit (2.2) for the receipt of empty loading units (L) and of loading units (L) filled with piece goods and also a storage-removal subunit (2.3) for the removal from storage of empty loading units (L) and of loading units (L) filled with piece goods.

The receiving unit (2.2) serves for the receipt of empty loading units (L) and of loading units (L) filled with piece goods (S).

The empty loading units (L) can, for example, be disposable items of delivery packaging and reusable items of delivery packaging which are to be held in order to be able to convey them, as required, in a manual or automated manner through the below-described storage-removal unit to the unit (1), where produced formulations can be drawn off. Appropriate empty reusable items of delivery packaging are evidently preferably cleaned before the receipt in the unit (2).

Loading units (L) filled with piece goods (S) can consequently be disposable items of delivery packaging and reusable items of delivery packaging which have been filled in the unit (1) with products (formulations) produced in said unit.

Loading units (L) filled with piece goods (S) can in particular also be raw materials supplied by raw material suppliers in particular loading units (original containers filled with raw materials). Equally, they can be standardized loading units (sL), as described in more detail further below, which have been filled with input materials, i.e., raw materials or intermediates.

Consequently, the empty loading units (L) can, in particular, also be emptied original containers which, for example, are to be received from the module (3) in order to be outwardly transferred from the entire system (i.e., the modular production system) via the module (2). Similarly, they can be standardized loading units (sL) which are to be held in order to be filled with raw materials and/or intermediates. Appropriate empty loading units (sL) are evidently preferably cleaned before the receipt in the unit (2).

Consequently, the receiving unit preferably serves for the receipt of empty loading units (L) and of loading units (L) filled with piece goods (S), this encompassing at least, but not absolutely exclusively,
  (i) empty disposable items of delivery packaging and reusable items of delivery packaging,
  (ii) disposable items of delivery packaging and reusable items of delivery packaging filled with formulations,
  (iii) original containers filled with raw materials,
  (iv) standardized loading units (sL) filled with raw materials,
  (v) standardized loading units (sL) filled with intermediates,
  (vi) empty original containers, and
  (vii) empty cleaned standardized loading units (sL).

The storage-removal unit (2.3) serves for the removal from storage of empty loading units (L) and of loading units (L) filled with piece goods (S).

The empty loading units (L) can, for example, be held disposable items of delivery packaging and reusable items of delivery packaging which are to be conveyed, as required, in a manual or automated manner from the unit (2) to the unit (1), where produced formulations can be drawn off. The same applies to empty standardized loading units (sL) into which intermediates produced in the unit (1) are to be drawn off.

Loading units (L) filled with piece goods (S) can consequently be disposable items of delivery packaging and reusable items of delivery packaging which have been filled in the unit (1) with products (formulations) produced in said unit, have been received in the unit (2) via the receiving unit, and are then, for example, to be removed from storage from the unit (2) for longer-term storage in a storage facility or for shipment to a customer.

Loading units (L) filled with piece goods (S) can in particular also be raw materials supplied by raw material suppliers in particular loading units (original containers filled with raw materials). Said loading units are preferably removed from storage in order to allow refilling in the refilling module (3).

The removal from storage of standardized loading units (sL) filled with raw materials or intermediates is self-evidently also fundamentally possible, but not specifically preferred. Generally, the raw materials and intermediates present in standardized loading units (sL) are transferred to the unit (1) via the devices (V) described further below and thus consumed. However, what can happen, for example owing to changes at short notice to the production schedule or owing to necessary repair work, is that already filled standardized loading units (sL) are not used in the longer term and are therefore to be removed from storage from the unit (2).

Consequently, the empty loading units (L) can, in particular, also be emptied original containers which are to be outwardly transferred from the entire system. Similarly, they can be standardized loading units (sL) which were previously filled with raw materials and/or intermediates and which have been emptied via the devices (V) and which are then, for example, to be outwardly transferred from the module (2) for cleaning.

Consequently, the storage-removal unit preferably serves for the removal from storage of empty loading units (L) and of loading units (L) filled with piece goods (S), this encompassing at least, but not absolutely exclusively,
   (i) empty disposable items of delivery packaging and reusable items of delivery packaging,
   (ii) disposable items of delivery packaging and reusable items of delivery packaging filled with formulations,
   (iii) original containers filled with raw materials,
   (vi) empty cleaned standardized loading units (sL),
   (vii) empty original containers, and
   (viii) empty soiled standardized loading units (sL).

From what has been described above, it follows that a modular production system according to the invention that is located in production preferably comprises the above-mentioned components (i) to (viii).

How the units described above in terms of their function, i.e., the receiving subunit and the storage-removal subunit, can be technically designed is easy to determine and adjustable on an individualized basis for a person skilled in the art with the aid of the function information provided. For example, it is possible to design the units as gates, doors, passages, openings or other passing means which, for example, allow one passageway or multiple passageways from a central unit (2.1) to other units of the entire system or to zones beyond the entire system. In this connection, it is also possible for one or more passageways to be part of both the receiving subunit and the storage-removal subunit.

In a preferred variant, the receiving subunit and the storage-removal subunit comprise in total at least three passageways,
   wherein at least three passageways are part of both the receiving subunit and the storage-removal subunit, and wherein
   at least one of said passageways allows the receipt and removal from storage between the unit (2.1) and a unit for longer-term storage and for the receipt and removal from storage of empty loading units (L) and of loading units (L) filled with piece goods (S) into the and out of the entire system (also called unit (4) below),
   at least one of said passageways allows the receipt and removal from storage between the unit (2.1) and the unit (1), and
   at least one of said passageways allows the receipt and removal from storage between the unit (2.1) and the unit (3).

As already indicated above, it is preferred that the modular production system according to the invention additionally comprises a further unit (3) which is coupled to the unit (2) and in which refilling of especially raw materials from original containers into standardized loading units (sL) takes place. Said raw materials can be fluid and solid raw materials. The refilling can, for example, be carried out via gravity-guided, manually performed pouring and tipping. Also possible is a pump-controlled refilling of fluid raw materials or robot-controlled tipping over of solid raw materials. The thus refilled raw materials or the filled standardized loading units (sL) are then re-received in the module (2). Also possible is that the unit (3) is coupled with a preferably existing further unit of the entire system, namely a storage unit (5) for, inter alia, solid raw materials. The solid raw materials are placed into storage therein especially in storage receptacles for longer-term storage, for example large-volume silos. The advantage of such a concept is that, for example, solid raw materials storable in the long term can be purchased not as piece good, but in large batches and thus more economically. The corresponding principle of storage in large-volume receptacles is likewise applied with regard to particular fluid raw materials involving, according to experience, high consumption in production. However, the refilling into standardized loading units (sL) preferably then does not take place in this case; instead, the fluid raw materials are fed directly to production in unit (1). For the sake of completeness, it should be noted that the last-mentioned principle is, of course, also at least fundamentally possible in connection with solid raw materials.

Moreover, it follows from the above that the modular production system according to the invention preferably additionally comprises a unit (4) for the storage or longer-term storage of empty loading units (L) and of loading units (L) filled with piece goods (S). The unit (4) can, for example, serve for the storage of disposable items of delivery packaging and reusable items of delivery packaging which have been filled with produced products (formulations) and are to be stored until shipment to a customer. Equally, it is possible here to store raw materials or intermediates in original containers or standardized loading units.

The unit (4) thus serves first of all for the potentially longer-term storage of different piece goods, compared to the holding in the unit (2.1), i.e., a potential storage of, for example, more than 48 hours. A brief storage is of course also possible, if, for example, there is a dispatch order for a product. The unit (4) thus serves, above all, also for the systemic and organizational relief of the unit (2.1), by a potentially longer-term storage of empty loading units (L) and of loading units (L) filled with piece goods (S) taking place in the unit. Said empty loading units (L) and loading units (L) filled with piece goods (S) are, then, those which are fundamentally intended for receipt in the unit (2.1) and/or have been removed from storage from the unit (2.1). The unit (4) thus preferably additionally serves as interface between the entire system (the production system according to the invention) and the outside world or the environment. This is because the unit (4), ultimately also as buffer zone for the unit (2) or unit (2.1), makes it possible to store empty loading units (L) and loading units (L) filled with piece goods (S) in a goal-oriented manner with respect to production demand and customer demand. Thus, the unit (4) preferably also has means (passageways) for the receipt and removal from storage of empty loading units (L) and loading units (L) filled with piece goods (S) into the and out of the entire system. Consequently, it likewise preferably has appropriate means (passageways) for receipt from the unit (2) or unit (2.1) and for removal from storage into the unit (2) or unit (2.1).

The unit (4) can, for this purpose, be arranged in close spatial proximity to the unit (2) or unit (2.1). However, it can equally be arranged at a certain spatial distance in relation thereto, for example in order to thus satisfy particular safety aspects or individual circumstances of the location of the production plant (e.g., building layout). An appropriate exchange can then, for example, take place via means for transporting heavy goods, such as forklift trucks.

Preferably, the unit (4) has devices for the labeling of delivery units and/or pallets. In this way, a required labeling of materials produced in the unit (1) and drawn off and marked especially in the unit (1.4) can take place. Via a central electronic control unit, the identity data of the material can be retrieved, processed in the devices for labeling, and utilized in the generation of a label.

It also follows from the above that the modular production system preferably additionally comprises a unit (5) for the storage or longer-term storage of solid and/or fluid raw materials not delivered as piece goods or delivered as bulk good. Here, the raw materials are stored in large-volume storage receptacles, for example silos or tanks, and can then either be fed directly to production in unit (1) via appropriate feed line systems and/or be fed to production via the unit (2) after appropriate refilling processes, for example in the unit (3).

The unit (2) further comprises a provision subunit (2.4) for the provision of piece goods (S) for the production of formulations, the unit having first of all for this purpose specific devices (V).

The devices (V) have means (V.1) for the automated docking of standardized loading units (sL).

Standardized loading units (sL) are to be understood to mean specific loading units (see above for the definition of loading unit) which are designed and standardized according to their function, i.e., are harmonized. Inherent to the feature (V.1) is that the standardization must extend at least to the reversible connection between loading unit (sL) and the devices (V) via the means (V.1) (docking).

Standardization of the loading units (sL) is self-evidently also possible in another way. For instance, the loading units can, independently of the described docking, be standardized with respect to their capacity volume, the shape geometry or the material. It is also possible to provide in a standardized manner an inlet for fluid or solid materials as piece goods, which inlet is preferably arranged on the upper side of the loading unit.

Fundamentally, exactly one type of standardized loading units (sL) can be used. It is also possible for multiple types of standardized loading units (sL) to be used.

Preference is given to the use of at least two types of standardized loading units (sL), it being possible for at least one type to ensure the transfer of fluid input materials (sL fluid) into the devices (V) and at least one type to ensure the transfer of solid raw materials (sL solid) into the devices (V). This is because, as described above, intermediates are preferably also produced via the unit (1), this requiring the provision of solid raw materials via the unit (2).

With respect to the standardization of the docking principle, it is possible, in connection with loading units (sL fluid) from which fluid input materials are to be withdrawn, to provide at the base of the loading unit a standardized fluid outflow and standardized attachments for the docking to the means (V.1). In this connection, the fluid outflow is self-evidently reversibly closable or openable. This can, for example, be realized via an electronically controllable valve or a mechanically coupleable plug connection. After the docking via the attachments, the fluid outflow is oriented such that a material flow from the loading unit (sL fluid) into the device (V) can fundamentally take place. Thus, there is, for example, a physical connection between the loading unit (sL fluid) and the device (V), said connection arising at least via the attachments of the loading unit (sL fluid) and appropriate docking devices on the means (V.1), it being possible in this state for the fluid outflow to, for example, protrude into the device (V). In this connection, the base region of the loading unit is preferably constructed such that it is optimized in terms of discharge and thus completely emptiable. It is also preferred that the loading units (sL fluid) have a standardized inlet preferably arranged on the upper side of the loading unit, namely an inlet openable and closable in an automated manner, for example a bunghole with bunghole closure, in order to allow an automated drawing-off via the below-described subunit (1.4).

The loading units (sL fluid) preferably have an uptake capacity (capacity volume) of from 250 to 1000 liters. The loading units can, for example, also comprise agitation devices or heating devices which, for example, can be powered electrically or via compressed air. Consequently, an input material which, for example, was previously pretreated in the below-described pretreatment unit (2.5) can also still be agitated or heated during provision, i.e., ultimately feeding to production. In this way, it can be ensured that the state of the input material, as reached in the context of the pretreatment, is maintained over the entire period of provision. Typical materials for the loading units (sL fluid) are, for example, steels of steel grades 1.4301, 1.4541 or 1.4571. The inlets for the filling of the loading units (sL fluid) with fluid materials are preferably arranged on the upper side. The base area of the loading unit is, for example, about 100×120 centimeters so as to be insertable into customary transport systems.

With respect to the standardization of the docking principle, it is possible, in connection with loading units (sL solid) from which solid input materials are to be withdrawn, to provide at the base of the loading unit a standardized solids outflow and standardized attachments for the docking to the means (V.1). In this connection, the solids outflow is self-evidently reversibly closable or openable. This can, for example, be realized via an electronically controllable cone or a metering screw, it additionally being possible for cone or screw to have removable closures. After the docking via the attachments, the solids outflow is oriented such that a material flow from the loading unit (sL solid) into the device (V) can fundamentally take place. Thus, there is, for example, a physical connection between the loading unit (sL solid) and the device (V), said connection arising at least via the attachments of the loading unit (sL solid) and appropriate docking devices on the means (V.1), it being possible in this state for the solids outflow to, for example, protrude into the device (V).

The loading units (sL solid) preferably have an uptake capacity (capacity volume) of from 1 to 2 cubic meters. Typical materials for the loading units (sL solid) are, for example, steels of steel grades 1.4301, 1.4541 or 1.4571 and also plastics such as, in particular, conductive polyethylene. The inlets for the filling of the loading units (sL solid) with solid materials are preferably arranged on the upper side.

As already indicated above, the standardization extends to the reversible connection between loading unit (sL) and the devices (V) via the means (V.1).

For this purpose, the means (V.1) can comprise docking devices which serve as counterparts or connecting elements in relation to the above-mentioned attachments on the loading units (sL fluid) and/or (sL solid). When a loading unit (sL) is brought up to a docking site (V.1) in an automated manner, it is automatically centered and arrested or coupled.

This results in, first of all, an orientation of the outflow of the loading unit (sL), which orientation is suitable for the material flow. Preferably, it is additionally possible via this coupling to ensure, via fundamentally known connecting elements, a supply of general auxiliary energies (electricity, vapor and/or compressed air) to the loading unit (sL) in order to thereby allow an automated opening of the loading unit (sL) for generation of a material flow or else to ensure a powering of agitation devices or heating devices within the loading unit.

The devices (V) additionally comprise means (V.2) for the automated withdrawal of defined quantities of piece goods present in the standardized loading units (sL). If the withdrawal is for the purposes of producing formulations, this concerns a withdrawal of fluid and solid input materials (raw materials and/or intermediates) for the production of formulations, especially coatings. If the withdrawal is for the purposes of producing intermediates, the entire system preferably being suitable therefor, this concerns a withdrawal of input materials selected from the group of fluid and solid raw materials and also fluid and solid intermediates.

The means (V.2) allow the withdrawal of defined quantities of solid or fluid materials, especially in the form of a specified mass flow. For this purpose, the means (V.2) can comprise weighing units (e.g., load cells) and/or mass flow meters, which can monitor and also regulate and adjust the material flow.

In connection with fluid input materials, the dimensioning of the particular mass flow meter is dependent here on the material flows and the viscosity of the input materials. The material flow is, for example, regulated via generally available conveyance means, for example pumps, the conveyance capacity of which can be set within a wide range, and/or a regulator valve which can influence the conveyance capacity via the reduction of the flow cross section. Where precisely the individual elements, for example the regulator valves, are situated in the entire construction is adjustable on an individual basis. For example, they can be situated in close proximity to the conveyance means, but also in close proximity to means (X) as mentioned further below (especially collection lines) and thus within a piping section (V.3). They can even be situated within a means (X). In the last-mentioned cases, although they are then located in a piping section (V.3) or in collection lines (X), their function means that they are clearly assigned to the means (V.2). The metering accuracy of known systems is at least 1%, based on the value of the addition. Furthermore, it is possible to limit the metering rate to a target value.

In connection with solid input materials, the mass flow can be regulated via the vibration of a cone situated in the solids container and/or the powering of a screw, which can be part of a solids container or of the device (V). A vibration unit or the like (if necessary in order to assist the flow properties of solids) can be present on the device (V) too. The metering accuracy of known systems is at least 2%, based on the value of the addition. Furthermore, it is possible to limit the metering rate to, for example, one kilogram per second. In this case, the means (V.2) thus comprise first of all means for the determination of a withdrawal quantity (especially load cells). Moreover, they comprise control means for the actual withdrawal mechanisms (i.e., for example the cones or screws arranged in the loading units (sL)). The control means would then be formed especially via an electronic control unit which controls the withdrawal mechanisms by taking into account the information determined by the load cells and regulates and adjusts the withdrawal process according to specification.

The devices (V) additionally comprise means (V.3) which transfer the defined quantities from (V.2) to the unit (1).

In connection with fluid materials, the means (V.3) can in particular be fluid-conducting piping systems, which then ultimately open into means (X), especially collection lines.

In connection with the transfer of solid materials, the means (V.3) are preferably a simple downpipe or a portion of said downpipe, with the other portion of the downpipe then formally being a means (X) as described below.

As already indicated above, the unit (1) is preferably also suitable for the production of intermediates and designed accordingly, especially with respect to the use of solid raw materials. The provision subunit (2.4) serves for the provision of piece goods (S) for the production of formulations (i.e., raw materials and intermediates). Since piece goods (S) for the production of formulations, as umbrella term, likewise encompass any piece goods for the production of intermediates, it is also possible via the unit (2.4) to provide all the necessary input materials for the production of intermediates.

The unit (2) preferably additionally comprises a pretreatment subunit (2.5) for the pretreatment of piece goods (S) for the production of formulations. For example, raw materials arising as piece goods can be pretreated after their transfer to standardized loading units (sL). Equally, it is possible to pretreat intermediates which, after their production in unit (1), are directly transferred to standardized loading units (sL) and are then received in the unit (2). To this end, especially the aforementioned loading units are transported from their positions in the holding unit (2.1) to the location of the desired pretreatment, pretreated there, and then transported to the devices (V) in order to be provided there for production. The pretreatment can, for example, encompass the homogenization of the piece goods, such as agitation, shaking, rotation and/or rocking, and also the heating of the piece goods.

The pretreatment can likewise be automated, depending on the current recipe requirements of the formulation to be produced or of the intermediate to be produced. This means that when the production sequence specifies that a raw material to be used or an intermediate to be used is to be provided for production at a given time and the pretreatment of such a raw material or intermediate is necessary or desired, the process of pretreatment in addition to transport to the pretreatment unit and subsequent transport to the provision unit is coordinated in an automated manner such that an optimal provision of the pretreated raw material or intermediate can take place.

A pretreatment may, for example, be desired or necessary in the case of an input material which is not fluid under fundamental conditions as per the definition above in order to lower the viscosity to the extent that a material usable as fluid input material is yielded. However, it may be equally desired, for example, to again lower the viscosity of an input material already fluid under the above-mentioned fundamental conditions and/or to achieve a homogenization.

The actual pretreatment can be carried out in different ways. For example, the actual loading units in which the input materials are situated can be shaken, agitated or rocked by appropriate devices. It is also possible to introduce an agitation device into a loading unit and to then remove it again. However, the pretreatment can also be achieved via means integrated in the loading units, for example via agitation devices or heating devices which can be present within loading units (sL fluid). In this connection, the pretreatment unit must thus merely comprise a bay for the loading unit and appropriate connections for the means which are integrated in the loading units and which are suitable for the pretreatment in order to power said means, for example electrically or via compressed air.

The unit (2) additionally comprises means (M) for the automated transport of loading units within and between units and subunits of the production system. The means are thus suitable for the stated automated transport. In this way, it is ultimately possible for transport steps and transfer steps described in the context of the present invention to be carried out within and between units and subunits. For example, the standardized loading units (sL) held in the unit (2.1) and filled with raw materials and intermediates can, depending on the current recipe requirements of the formulation to be produced or of the intermediate to be produced, be transported in an automated manner to the unit (2.4) and thus the devices (V) in order to allow the feeding of the particular raw material or intermediate to the production process. Similarly, it is possible to transfer empty and filled loading units between the units (3) and (2.1) or between the units (1) and (2.1), especially the units (1.4) and (2.1), or the units (2) and (4). Further possible transport paths and transfer paths are apparent from the description.

A person skilled in the art knows how to technically design such means (M); however, a brief description will nevertheless be given on the basis of the automated transport of loading units between the subunit (2.1) and the subunit (2.4) and hence the devices (V).

Situated within corridors in a high-rack storage facility (2.1) are storage-and-retrieval machines which can be guided in an automated manner (controlled by electronic control units) through the corridors and can, in the course of this, place loading units into storage in the holding positions of the unit (2.1) or remove them from storage from said positions. It is also possible for a high-rack storage facility to have a central zone for placement into storage and removal from storage, via which loading units are to be guided into the high-rack storage facility or guided out in a centralized manner. From there, the loading units are then, in the case of planned placement into storage, brought by the storage-and-retrieval machines to the individual holding positions. It proceeds the other way round in the case of removal from storage. Loading units are, then, fed into or fed out of the high-rack storage system via devices which are similar or correspond to the already mentioned storage-and-retrieval machines and thus also ensure the automated transport to the subunit (2.4) and thus the devices (V).

The storage-and-retrieval machines are generally rail-guided, single-lane vehicles. They can also have switch systems and/or relocators, which make it possible to serve multiple corridors or even an entire high-rack storage facility. In any case, the storage-and-retrieval machines move in three axes, namely along the corridor (longitudinal direction of the aisle, travel unit), in a vertical direction (lifting unit) and in a lateral direction of the aisle (for transferring loading units into the or out of the holding positions). In addition to or instead of such single-lane vehicles, the movements in a storage facility can, for example, also be achieved by slide systems, which move through a storage facility on rails and with the aid of elevators in order to carry out transport processes.

The above-described unit (2) serves for the effective handling of piece goods and loading units in the context of an industrial production process for formulations, and an extremely effective overall process for production is ensured as a result. This is because the quality of such an overall process is, besides the actual production, especially also dependent on the temporally and spatially effective and coordinated organization of feeding, provision, removal from storage and optionally pretreatment of piece goods and loading units.

Unit (1)

The modular production system according to the invention comprises the unit (1), as already mentioned above, for the production and drawing-off of formulations, preferably formulations (i.e., products) and intermediates.

As already described above, the unit (1) comprises means which make it possible to receive the defined quantities of piece goods for the production of formulations that are transferred from unit (2). Since the transfer takes place via the above-described means (V.3), it thus follows that the unit (1) is connected via said means to the means (V.3) and thus to the unit (2). How precisely this connection can be designed in the individual case, for example via appropriate piping, is adjustable on an individual basis.

For the sake of greater clarity, said means of the unit (1) are also referred to as means (X).

The unit (1) can ultimately be any production and filling line known in this connection.

In the unit (1), it is thus possible, for example, for formulations to be produced and drawn off by means of a manufacturing method based on combining all materials at the start of the procedure. The disadvantages of this way of manufacturing are, however, known. Thus, within the unit (1), formulations are preferably produced and drawn off by means of a manufacturing method based on using pastes and mixing coats. As is known, in this form of manufacturing, intermediates such as pigment pastes, tinting pastes, functional pastes and mixing coats are first produced and then mixed efficiently according to requirements. In order to then arrive at the product (the formulation), merely certain color-adjustment steps or finishing steps (e.g., tinting steps or viscosity adjustments) are then optionally necessary. The advantage of this method is that the respective intermediates can be produced in, in each case, an individually adjusted and optimized manner. For this reason too, the unit (1) is, as already indicated above, suitable for likewise producing intermediates.

The components usable and required within production and drawing-off are fundamentally known to a person skilled in the art and do not need a detailed explanation. It should merely be noted that it is possible to use, for example, the known tanks, reactors, dissolvers, agitator mills, rotor-stator assemblies, and stationary and mobile agitator receptacles for the preparation, dispersion and finishing steps. Appropriate filter stations for the filtration of the products and appropriate drawing-off and, optionally, marking means are known too.

Preferred configurations of the unit (1) are described below.

The unit (1) preferably comprises a subunit (1.1) for the production of intermediates with at least proportional use of solid input materials, especially solid raw materials (solids). Relevant intermediates are colored pigment pastes, i.e., chromatic, achromatic and/or effect-giving pigment pastes (color pastes and/or effect pastes), or else functional pastes, i.e., pastes which, for example, contain functional fillers and are consequently used in coating solely or predominantly because of their function and not because of their coloring. The definitions of colored pigment pastes and functional pastes overlap; a clear distinction from one another is neither possible nor desired. Relevant intermediates are also pure pigment mixtures and/or filler mixtures.

Appropriately solid raw materials are especially the pigments and fillers that are known per se.

Evidently, use is usually also made in this production of fluid input materials, i.e., raw materials or preproduced intermediates. It is also possible to use input materials pretreated such that they can be used as fluid input materials. This preferably takes place in the pretreatment unit (2.5).

By way of example, resins, solvents and additives and also certain mixing coats can be mentioned here.

The subunit (1.1) preferably comprises the fundamental devices known in connection with the production of pastes, i.e., mixing receptacles (process mixers) and mixing devices, for example dissolvers such as standard dissolvers or inline dissolvers and optionally agitator mills which serve for the dispersion and mixing of solid and fluid raw materials and fluid intermediates in the process mixers.

In this connection, the feeding of solid input materials, especially raw materials, to the subunit (1.1) preferably takes place in any case, but not absolutely exclusively, via the subunit (2.4) and thus via the devices (V) and also the means (X). The same self-evidently applies to fluid input materials (or input materials which are fluid after pretreatment).

Thus, it is ultimately possible via the stated components of the entire system for an automated transfer of solid and fluid input materials (or input materials which are fluid after pretreatment) to take place from standardized loading units (sL), filled with said input materials, within the module (2) to the subunit (1.1). Appropriate specifications for setting the mass flow and thus the quantities of input materials fed per unit time or overall can be obtained via recipe specifications in an electronically controlled manner. The standardized loading units (sL) were then, beforehand, especially preferably filled in the module (3) with the input materials (from original containers or from large-volume silos or tanks) and optionally pretreated.

It is especially preferred here that solid raw materials are first refilled within the unit (3) from original containers (e.g., sacks) into standardized loading units (sL) and are then transferred to the subunit (1.1) via the subunit (2.4) and thus via the means (V.3) and also the means (X). In this connection, the solid raw materials are preferably refilled in the unit (3) using robots which can pick up piece goods in loading units (e.g., a pulverulent pigment in a sack) via grippers and can then open the loading units with the involvement of means such as cutting tools and then transfer the piece good to the loading units (sL).

An additional transfer of certain raw materials, especially fluid raw materials, can, for example, also take place directly from large-volume receptacles such as tanks. Said transfer can take place with the involvement of technical means for the monitoring and regulation of the mass flow, as has already been described above for the means (V.2). Here too, specifications for setting the mass flow of input materials are preferably obtained via recipe specifications in an electronically controlled manner.

In a preferred embodiment of the present invention, the feeding of the input materials proceeds as follows. Fluid input materials (or input materials which are fluid after pretreatment) arising as piece goods are transferred to one or more collection lines via the means (V.3) in an automated manner, for example via fluid-conducting piping systems known per se. Via such a collection line (corresponds then to a means (X)), the input materials can then be fed to the process mixer. It is likewise possible to transfer to the collection line further fluid input materials (or input materials which are fluid after pretreatment) which are directly withdrawn from large-volume receptacles such as tanks. Self-evidently, the feeding of the solid input materials does not take place via the stated collection line; instead, they are directly transferred to the process mixer from the means (V.3), for example through individual feed lines/pipings (corresponds then to a means (X)).

In this connection, the feeding of the input materials via the means (X) can take place in any desired sequence (sequentially, in parallel, partly in parallel) in an automated and electronically controlled manner in order, for example, to feed input materials to the process mixer separately from one another, which input materials react with one another when highly pure or highly concentrated and/or are incompatible.

It follows from the above that the production in the subunit (1.1) preferably takes place in a discontinuous manner. This means that an intermediate is produced batchwise using the aforementioned mixing devices after complete feeding of the input materials into an appropriate process mixer.

The intermediates which are then completed in subunit (1.1) and contain solid raw materials are then transferred to storing units intended therefor via filling lines known per se. Especially preferably, the pastes are drawn off into standardized loading units (sL) and then received via the subunit (2.2) in the unit (2), where they can then be held in the subunit (2.1) for the production of products (formulations).

It is of course possible for the mixture withdrawn from the process mixer to be also treated prior to drawing-off via fundamentally known wet-grinding machines such as, for example, agitator mills and/or inline dissolvers.

Preferably, the unit (1) of the production system according to the invention thus comprises a subunit (1.1) for the production of intermediates with at least proportional use of solid input materials, comprising a. at least one process mixer,
b. at least one mixing device, arranged in the process mixer, for the dispersion and mixing of solid and fluid input materials,
c. means (X1) for the transfer of solid input materials to the process mixer, the means (X1) being connected to means (V.3),
d. means (X2) for the transfer of fluid input materials to the process mixer, the means (X2) being connected to means (V.3) and the means (X2) comprising at least one collection line for the sequential, parallel and/or partly parallel transfer of input materials to the process mixer, and
e. preferably means for the transfer of fluid input materials directly from large-volume receptacles such as tanks to the collection line.

The unit (1) preferably comprises a further subunit (1.2) for the production of formulations and intermediates using fluid input materials and/or input materials which can be used as fluid input materials as a result of pretreatment. Said pretreatment preferably takes place in the pretreatment unit (2.5). Preferably, the aforementioned input materials are exclusively used.

Relevant formulations are clear coats and coats containing coloring and/or effect-giving pigments and/or fillers (e.g., fillers, base coats). Relevant intermediates are mixing coats which consist of raw materials such as resins, solvents and additives, but do not contain pigments or fillers. Relevant intermediates are also pigment pastes and functional pastes which consist of intermediates (such as fluid pigment pastes) previously produced in subunit (1.1) and further raw materials and/or intermediates.

The subunit (1.2) preferably comprises the devices known in connection with the production of the stated formulations and intermediates, i.e., process mixers and also mixing devices such as, for example, dissolvers for the mixing and homogenization of the input materials in the process mixers.

In this connection, the feeding of fluid input materials (or input materials which are fluid after pretreatment) to the subunit (1.2) preferably takes place in any case, but not absolutely exclusively, via the subunit (2.4) and thus via the devices (V) and also the means (X).

Thus, it is ultimately possible via the stated components of the entire system for an automated transfer of fluid input materials (or input materials which are fluid after pretreatment) to take place from standardized loading units (sL), filled with said input materials, within the module (2) to the subunit (1.2). Appropriate specifications for setting the mass flow and thus the quantities of input materials fed per unit time or overall can be obtained via recipe specifications in an electronically controlled manner. The standardized loading units (sL) were then, beforehand, especially preferably filled in the module (3) with the input materials (from original containers or from large-volume tanks) and optionally pretreated.

An additional transfer of certain fluid raw materials can, for example, also take place directly from large-volume receptacles such as tanks. Said transfer can take place with the involvement of technical means for the monitoring and regulation of the mass flow, as has already been described above for the means (V.2). Here too, specifications for setting the mass flow of input materials can be obtained via recipe specifications in an electronically controlled manner.

In a preferred embodiment of the present invention, the feeding of the input materials proceeds as follows. Fluid input materials (or input materials which are fluid after pretreatment) arising as piece goods are transferred to one or more collection lines via the means (V.3) in an automated manner. Via such a collection line (corresponds then to a means (X)), the input materials can then be fed to the process mixer. It is likewise possible to transfer to the collection line further fluid input materials (or input materials which are fluid after pretreatment) which are directly withdrawn from large-volume receptacles such as tanks.

In this connection, the feeding of the raw materials via the means (X) can take place in any desired sequence (sequentially, in parallel, partly in parallel) in an automated and electronically controlled manner in order, for example, to feed input materials to the process mixer separately from one another, which input materials react with one another when highly pure or highly concentrated and/or are incompatible. It is also possible in this connection for the current content of the process mixer to be recirculated via the collection line and to serve as carrier flow for further input materials.

Thus, the production in the subunit (1.2) can take place strictly in a discontinuous manner. Formulations and intermediates can be produced batchwise using the aforementioned mixing devices after complete feeding of the input materials into an appropriate process mixer.

The thus completed formulations and intermediates can then be transferred to storing units intended therefor via filling lines known per se. For example, the intermediates can be drawn off into standardized loading units (sL) and then received via the subunit (2.2) in the unit (2). There, intermediates in the subunit (2.1) can be held for the production of products (formulations). In a preferred variant, intermediates are directly fed to the subunit (1.3), especially via fluid-conducting pipings and optionally interposition of conveyance means such as pumps and valves. Formulations are preferably drawn off into disposable items of delivery packaging or reusable items of delivery packaging, then preferably received in the unit (2) via the receiving unit (2.2) and transferred to the unit (4) from the unit (2) via the storage-removal unit (2.3) for longer-term storage or directly shipped to a customer.

A particularly preferred configuration of the subunit (1.2) is described below.

In this embodiment, the unit (1.2) does not only comprise the already described process mixers as receptacles. On the contrary, the unit (1.2) comprises one or more combinations of at least two different receptacles, and, within such a combination, the first receptacle is a process mixer and the second receptacle is a buffer tank for fluid mixtures drained from the process mixer. Process mixer and buffer tank are connected to one another, meaning that mixtures produced in the process mixer, for example intermediates or formulations, can be specifically drained into the buffer tank. This is technically achievable in a problem-free manner via an appropriate fluid-conducting piping and interposition of conveyance means such as pumps and valves. Within the connection unit between process mixer and buffer tank, it is also possible to arrange yet a further mixing device, for example an inline dissolver. In particular, said inline dissolver can also serve for the mixing of a material flow to be recirculated as described above. Self-evidently, there are then arranged in the process mixer and in the buffer tank typical mixing devices which ensure a mixing of input materials and thus the production of fluid intermediates and formulations (process mixer) or keep the compositions produced homogenized in order to prevent deposition processes (buffer tank).

The feeding of input materials to the process mixer then takes place as described above, especially also with the involvement of an appropriate collection line. The drawing-off or direct feeding to the subunit (1.3) then likewise takes place as described above, and, in this case, the formulations and intermediates are drained not from the process mixer, but from the buffer tank.

Within a combination, it is preferred that the buffer tank has a capacity volume larger than the process mixer. Particularly preferably, the buffer tank has, in comparison with the process mixer, an at least 2-fold capacity volume, especially preferably an at least 3-fold capacity volume. In this connection, the process mixer has, for example, a capacity volume of from 0.1 to 60 tonnes, such as, for example, 0.5 to 30 tonnes or else 1 to 15 tonnes or 2 to 5 tonnes.

The advantage of the described installation concept of combinations of process mixers and buffer tanks is that it is thus possible to produce formulations and intermediates in a particularly effective, exact and, within process control, adjustable manner.

For example, if a first sub-batch of a material to be produced has been produced in the process mixer on the basis of especially electronically documented recipe specifications, said sub-batch can be transferred to the buffer tank. Depending on the properties of the first sub-batch (actual state), the desired properties of the material to be produced overall (target state) and the number of sub-batches to be produced overall and/or the size (mass, volume) of further sub-batches, it is possible to achieve a specific adjustment of the feeding of input materials in the production of one or more further sub-batches. This makes it possible to compensate for, for example, fluctuations in the properties of the raw materials or intermediates used, which fluctuations can lead, in the case of defined use quantities, to the production of a first sub-batch having an actual state deviating from the target state. Further details in relation to this are described further below in the context of the process according to the invention.

Preferably, the subunit (1.2), especially in connection with the stated combination of process mixer and buffer tank, therefore has a measuring device for the determination of properties of a fluid formulation produced in the process mixer or of an intermediate produced in the process mixer. The measuring device can, for example, be assigned to the fluid-conducting piping (connection) of process mixer and buffer tank. This means that, via the piping (or the corresponding connecting line systems), produced fluid material can be branched off and be ultimately transferred to a measuring device. The transfer to the measuring device can be achieved in an automated or else manual manner. In the measuring device, it is then possible to capture various properties of the fluid material such as viscosity, pH, conductivity, density, temperature, this being initiated in an automated or manual manner. It is also possible for the measuring device to be arranged within the line system and, for example, for an analysis to be carried out in an automated manner via one or more sensors for the capture of properties of the fluid material.

Likewise preferably, the subunit (1.2), especially in connection with the stated combination of process mixer and buffer tank and the measuring device, comprises an evaluation device, communicating with the measuring device, for the determination of a deviation of properties of the material produced in the process mixer (actual state) and the corresponding properties of a predefined target state. This evaluation can also be carried out in an automated manner for example (comparison of actual state with reference values).

Last but not least, the unit (1.2), especially in connection with the stated combination of process mixer and buffer tank, the measuring device and also the evaluation device communicating with the measuring device, preferably comprises a specific device for the adjustment of the feeding of input materials into the process mixer.

In this connection, the device for the adjustment of the feeding of input materials is connected to the evaluation unit, for example via an electronic information transfer unit, i.e., can communicate therewith.

Now, if a first produced sub-batch has been measured with respect to relevant properties, said properties have been compared with a target state and the sub-batch has been transferred to the buffer tank, the production of one or more further sub-batches can be carried out with adjustment of the feeding of input materials into the process mixer. As a result, it is then possible to obtain a material within specification, i.e., a material having—within acceptable error limits—the target state.

For example, it is possible via the deviations between actual state of the first sub-batch and target state, as captured by means of the evaluation unit, to carry out an adjustment of quantities of input materials fed overall and/or per unit time to the process mixer in one or more further sub-batches. If, in the context of the production of the first sub-batch, an excessively high proportion of a first input materials has been used, a corresponding overproportionate lowering of the fed quantity takes place for example in one or more further sub-batches in order to obtain altogether a material within specification. In the case of excessively low proportions of input materials, the reverse accordingly happens.

The adjustment of the feeding of input materials can, on the one hand, be achieved with automated adjustment of the withdrawn quantities of input materials via the means (V.2) and thus also adjustment of the transfer from the means (V.3). As already described above, the fundamentally fed quantity of input materials can be achieved via the regulation of the mass flow in the means (V.2). Equally, the mass flow of input materials can of course be corrected and thus adjusted. This is then done using the information obtained from the evaluation unit.

On the other hand, in the case of direct feeding of fluid input materials from, for example, tanks into a collection line, the associated feed valves must likewise be adjusted with respect to the mass flow. As already indicated above, the fundamental transfer of input materials can take place with the involvement of technical means for the monitoring and regulation of the mass flow, as has already been described above for the means (V.2). Consequently, the information obtained from the evaluation unit can be used to also correct and thus adjust the mass flow.

Information from the evaluation unit is preferably transferred with the involvement of electronic information transfer units.

Consequently, the device for the adjustment of the feeding of input materials is preferably designed as an electronic control unit which processes electronically transferred property data from the evaluation unit, correlates them if necessary with further relevant input parameters, especially number and size of sub-batches to be produced, determines adjusted quantities of input materials and then electronically initiates an adjustment of the feeding of input materials. Self-evidently, it is necessary for this purpose for the actual dosing mechanisms comprising the technical means for the correction and thus adjustment of the mass flow (devices (V) or appropriately controlled dosing units for the transfer from, for example, tanks to the collection line) to be able to be electronically controlled via the electronic control unit.

Preferably, the unit (1) of the production system according to the invention thus comprises a subunit (1.2) for the production of formulations and intermediates using fluid input materials and/or input materials which can be used as fluid input materials as a result of pretreatment, comprising a. at least one combination of a process mixer and a buffer tank, with process mixer and buffer tank containing mixing devices, b. at least one fluid-conducting connection between process mixer and buffer tank for the transfer of sub-batches of formulations and intermediates, as produced in the process mixer, from the process mixer to the buffer tank, c. means (X3) for the transfer of fluid input materials to the process mixer, the means (X3) being connected to means (V.3) and the means (X3) comprising at least one collection line for the sequential, parallel and/or partly parallel transfer of input materials to the process mixer, d. preferably means for the transfer of fluid input materials directly from large-volume receptacles such as tanks to the collection line, e. at least one measuring device for the determination of properties of a sub-batch of a fluid formulation or of a fluid intermediate, as produced in the process mixer, f. at least one evaluation device, communicating with the measuring device, for the determination of a deviation of the properties of sub-batches produced in the process mixer from the properties of a predefined target state, g. at least one device, communicating with the evaluation unit, for the adjustment of the feeding of input materials into the process mixer, which device is set up to take into account the deviations of the properties of a produced sub-batch from the properties of a predefined target state and to take into account the number and size of further sub-batches in order to adjust the fed quantities of input materials in the production of further sub-batches, and h. at least one forwarding unit for the forwarding of intermediates from the buffer tank to at least one further production unit of the production system.

Self-evidently, it is clear from the above that the device for the adjustment of the feeding of input materials g. is preferably set up with respect to the actual adjustment such that, after the production of all sub-batches (i.e., the total batch), the total batch has the target state (i.e., is within specification). Thus, this means that the appropriate adjusted quantities of input materials which are required for the setting of the target state of the total batch are determined in the device for adjustment, before said device then causes an appropriate adjustment of the feeding of input materials.

It is preferred that clear and white formulations and intermediates are produced in the unit (1.2); preferably, clear and white formulations and intermediates are exclusively produced. Very preferably, clear formulations and intermediates are exclusively produced. A clear formulation is, for example, a clear coat; a clear intermediate is, for example, a mixing coat which is to be used later for the production of formulations. A white formulation is, for example, a plain white base coat. The reason therefor is that especially the described installation concept having a combination of process mixer and buffer tank can be cleaned rapidly and efficiently without manual interventions in accordance with the CIP (Cleaning In Place) method known per se. Moreover, this allows an optimal utilization of the unit in connection with the following subunit (1.3).

The unit (1) preferably comprises a further subunit (1.3) for the production of colored and/or effect-giving formulations using fluid input materials and/or input materials which can be used as fluid input materials as a result of pretreatment. Said pretreatment preferably takes place in the pretreatment unit (2.5).

Relevant formulations are especially coats containing coloring and/or effect-giving pigments, for example plain base coats or effect-giving base coats. Coats such as fillers, which generally contain white pigments and/or black pigments, can be fundamentally assigned to the colored formulations too. Possible input materials for the production of these formulations include especially the intermediates produced in subunit (1.1), for example color pastes and/or effect pastes, and the mixing coats produced in subunit (1.2). Self-evidently, the use of fluid raw materials is additionally possible.

The subunit (1.3) can comprise the devices already described above and known in connection with the production of formulations, i.e., process mixers and also mixing devices such as, for example, dissolvers for the mixing and homogenization of the input materials in the process mixers. The feeding of the input materials can then fundamentally likewise take place as described above, for example via the means (V.3) and (X) and/or directly from large-volume receptacles such as tanks. The then completed formulations can be drawn off into disposable items of delivery packaging or reusable items of delivery packaging via known filling lines and can then be, for example, received in the unit (2) via the receiving unit (2.2) and transferred to the unit (4) from the unit (2) via the storage-removal unit (2.3) for longer-term storage or directly shipped to a customer.

A particularly preferred configuration of the subunit (1.3) is described below.

In this embodiment, the unit (1.3) does not comprise or does not only comprise the above-described process mixers including mixing devices for thereby ultimately ensuring a discontinuous production. On the contrary, the unit (1.3) comprises the below-described means for the continuous production of colored and/or effect-giving formulations.

For this purpose, the unit (1.3) comprises first of all a small-volume process mixer (kP), including mixing device. Here, the mixing devices are preferably inline dissolvers, static mixers or rotor-stator mixers. Here, the term small-volume refers to a significantly lower capacity volume in comparison with process mixers used on the industrial scale for production (usually a multiple-tonne capacity volume). For example, the process mixer has a capacity volume of from 0.1 to 100 liters, such as, for example, 0.5 to 50 liters or else 1 to 20 liters, especially 1 to 10 liters, for example 5 liters. The process mixer is set up such that the mixing device is arranged between the inlets for the feeding of input materials and the at least one outlet for the discharge of produced formulations. Thus, the input materials flowing into the process mixer (kP) must pass through the mixing device before exiting from the process mixer. The small mixing volume dictated by the small size of the process mixer and corresponding high energy inputs due to the mixing device can achieve an efficient mixing of the input materials in the context of a continuous production of formulations. Continuous production is to be understood to mean that the input materials for production flow into the process mixer (kP) in continuous, specifically adjustable mass flows and the input materials then leave the process mixer via the outlet(s) in the form of a mixture after passage through the mixing device, i.e., as formulation, in a likewise continuous mass flow. Typical outputs of the mixing devices, for example of a rotor-stator mixer, are in the range from 1 to 250 kW, especially 5 to 200 kW, preferably 25 to 150 kW, more preferably 50 to 125 kW or else 85 to 95 kW, it being possible for a person skilled in the art to adjust the output in a problem-free manner to the other parameters of the process mixer (kP), for example the capacity volume (low capacity volumes correspond to rather lower outputs). The rotational speeds can vary depending on the construction, and typical rotational speeds can be between 1000-10 000 rpm, especially 2000-6000 rpm or else 3000-4000 rpm. Preferably, the process mixer is completely filled during production and thus free of air, meaning that production can be carried out without foam development.

The feeding of the input materials preferably takes place as follows. First of all, intermediates produced in the subunit (1.2), especially clear intermediates, are directly fed from said subunit as main material flows, especially via fluid-conducting pipings and optionally interposition of conveyance means such as pumps and valves. Specifications for the setting of the mass flow can be obtained via recipe specifications in an electronically controlled manner. Technical means for the realization of a specific mass flow are described above, especially in the case of the means (V.2).

Furthermore, the intermediates produced in the unit (1.1), for example color pastes and/or effect pastes, are preferably used for the introduction of color pigments and/or effect pigments and of functional fillers. As described above, said intermediates are preferably held in standardized storing units (sL) in the subunit (2.1) and can then be provided via the subunit (2.4). Ultimately, the input materials are transferred to the process mixer via the means (V.3), for example through individual feed lines/pipings (corresponds then to a means (X)). Appropriate specifications for the setting of the mass flow via the means (V.2) and thus of the quantities of input materials that are fed per unit time or overall can be obtained via recipe specifications in an electronically controlled manner.

It is of course also fundamentally conceivable to feed fluid intermediates and raw materials in a different way, for example directly from large-volume receptacles such as tanks. Equally, it is of course also possible for clear intermediates to be additionally fed in an automated manner from standardized storing units (sL) via the subunit (2.4).

The mass flow let out of the process mixer (kP) is then transferred via fluid-conducting pipings to a buffer tank, including mixing devices for the prevention of deposition processes. In this connection, the buffer tank has, for example, a capacity volume of from 1 to tonnes and is continuously filled up by the material let out of the process mixer.

The advantage of the described installation concept of combinations of process mixers and buffer tanks is that it is thus possible, independently of the batch size, to produce formulations and intermediates in a particularly effective, exact and, within process control, adjustable manner.

For example, a start is made to continuously produce a batch of a material to be produced via the process mixer (kP) on the basis of especially electronically documented recipe specifications. Depending on the properties of the material produced at the start of the batch production (actual state), the desired properties of the material to be produced overall (target state) and the size (mass, volume) of the batch, it is possible to achieve a specific adjustment of the feeding of input materials in production. This makes it possible to compensate for, for example, fluctuations in the properties of the intermediates used, which fluctuations can lead, in the case of defined mass flows, to the production of material having an actual state deviating from the target state. Moreover, the comparatively large capacity volume of the buffer tank or individual capacity volume to be adjusted of the buffer tank ensures that the size of the batch can still be adjusted retrospectively. For example, this presents itself when the actual state of the material produced at the start deviates particularly significantly from the target state. Further details in relation to this are described further below in the context of the process according to the invention.

Preferably, the subunit (1.3), especially in connection with the stated combination of process mixer (kP) and buffer tank for continuous production, therefore has a measuring device for the determination of properties of a fluid formulation produced in the process mixer. The measuring device can, for example, be assigned to the fluid-conducting piping (connection) of process mixer and buffer tank. This means that, via the piping (or the corresponding connecting line systems), produced fluid material can be branched off and be ultimately transferred to a measuring device. The transfer to the measuring device can be achieved in an automated or else manual manner. In the measuring device, it is then possible to capture various properties of the fluid material such as viscosity, pH, color, density, conductivity and temperature, this being initiated in an automated or manual manner. It is also possible for the measuring device to be arranged within the line system and, for example, for an analysis to be carried out in an automated manner via one or more sensors for the capture of properties of the fluid material.

Likewise preferably, the subunit (1.3), especially in connection with the stated combination of process mixer (kP) and buffer tank and the measuring device, comprises an evaluation device, communicating with the measuring device, for the determination of a deviation of properties of the material produced in the process mixer (actual state) and the corresponding properties of a predefined target state. This evaluation can also be carried out in an automated manner for example (comparison of actual state with reference values).

Last but not least, the unit (1.3), especially in connection with the stated combination of process mixer (kP) and buffer tank, the measuring device and also the evaluation device communicating with the measuring device, preferably comprises a specific device for the adjustment of the feeding of input materials into the process mixer.

In this connection, the device for the adjustment of the feeding of input materials is connected to the evaluation unit, for example via an electronic information transfer unit, i.e., can communicate therewith.

Now, for example, if at the start of the continuous batch production the produced material has been measured with respect to relevant properties and if said properties have been compared with a target state, the further continuous production can be carried out with adjustment of the feeding of input materials into the process mixer. In this connection, it is advantageous to regularly measure the properties of the produced material at specific intervals or in a continuous manner and to compare them with the target state in order to thereby ensure an iterative adjustment of the feeding of input materials. As a result, it is then possible to obtain a batch of material within specification, i.e., material having—within acceptable error limits—the target state.

In this connection, it is, for example, possible to achieve an overproportionate lowering or raising of the mass flow of one or more input materials in order to ultimately obtain a material within specification. Owing to the process mixer (kP) which is, however, very small in comparison with the buffer tank, it is generally possible, despite high flow rates, to achieve the material flow settings for obtaining the target state before 5 percent by mass of the batch volume has been produced. If, then, further production is carried out with preservation of the settings for obtaining the target state and draining into the buffer tank is carried out, it is also possible to obtain, without overproportionate adjustment of the mass flows, a batch of material within specification, in which batch the material produced at the start has been blended.

The adjustment of the mass flows and the configuration of the device for the adjustment of the feeding of input materials as electronic control unit is possible in the manner described for subunit (1.2).

The then completed formulations can then, as described above, be drawn off from the buffer tank into disposable items of delivery packaging or reusable items of delivery packaging and then be, for example, received in the unit (2) via the receiving unit (2.2) and transferred to the unit (4) from the unit (2) via the storage-removal unit (2.3) for longer-term storage or directly shipped to a customer.

Preferably, the unit (1) of the production system according to the invention thus comprises a subunit (1.3) for the continuous production of colored and/or effect-giving formulations using fluid input materials and/or input materials which can be used as fluid input materials as a result of pretreatment, comprising a. at least one combination of a small-volume process mixer (kP) and a buffer tank, with process mixer and buffer tank containing mixing devices, b. at least one fluid-conducting connection between process mixer and buffer tank for the transfer of a formulation continuously produced in the process mixer from the process mixer to the buffer tank, c. means (X4) for the transfer of fluid intermediates containing coloring and/or effect-giving pigments and/or fillers to the process mixer (kP), the means (X4) being connected to means (V.3),
d. at least one fluid-conducting connection between the process mixer (kP) and the subunit (1.2) for the transfer of fluid intermediates produced in the unit (1.2),
e. at least one measuring device for the determination of properties of a fluid formulation continuously produced in the process mixer (kP),
f. at least one evaluation device, communicating with the measuring device, for the determination of a deviation of the properties of a formulation continuously produced in the process mixer (kP) from the properties of a predefined target state, and
g. at least one device, communicating with the evaluation unit, for the adjustment of the feeding of input materials into the process mixer (kP), which device is set up to take into account the deviations of the properties of a continuously produced subquantity of a formulation from the properties of a predefined target state in order to adjust the fed quantities of input materials in the continuous production of further subquantities.

Last but not least, the production system according to the invention preferably additionally comprises, in the unit (1), a subunit (1.4) for the automated drawing-off and marking of produced intermediates and formulations, especially of the intermediates and formulations produced in the subunits (1.1), (1.2) and (1.3).

Thus, the drawing-off already mentioned above in the context of the description of the aforementioned subunits can take place in the subunit (1.4). For this purpose, the unit (1.4) has available storing units, which are then filled in an automated manner when required. The delivery units can be especially disposable items of delivery packaging and reusable items of delivery packaging which are to be filled and also standardized loading units (sL).

The subunit (1.4) thus comprises the devices which are fundamentally typical of filling lines, said devices being known and it consequently being possible to dispense with a detailed explanation thereof. It should merely be pointed out that the unit self-evidently comprises means for letting out produced materials (e.g., formulations) (filling heads with filling lances) and positions for the provision of items of delivery packaging for filling with produced materials.

An automated drawing-off can, for example, be achieved very efficiently when the delivery units to be filled comprise inlets which are openable and closeable in an automated manner, for example bungholes with corresponding bunghole closures.

The unit (1.4) thus preferably comprises means for the automated opening and closing of inlets of delivery units. These can be tools which are known per se and which can open the bunghole by removal of the bunghole closure and carry the closure. Additionally present are means or tools which are set up to carry the filling head with the filling lance and to introduce it into the inlet of the item of delivery packaging. The drawing-off is achieved by transfer of the produced material from the production unit, for example a process mixer or buffer tank, to the item of delivery packaging via the letting-out means (filling head with filling lance). The mass flow can be set via conveyance means already mentioned above, such as pumps and electronically controllable valves. The quantity to be drawn off can, for example, be regulated via balances and/or mass flow meters.

After drawing-off, the bunghole is closed via the means for the automated opening and closing of inlets, i.e., the tool which can carry the closure.

The items of delivery packaging which are to be filled are preferably transported in an electronic and order-driven manner from the module (2) via the storage-removal subunit (2.3) to the subunit (1.4) and, therein, to the positions for the provision of items of delivery packaging for filling with produced materials. After filling, the items of delivery packaging are, for example, received in the unit (2) via the receiving unit (2.2) and transferred to the unit (4) from the unit (2) via the storage-removal unit (2.3) for longer-term storage or directly shipped to a customer.

This procedure can, for example, also be carried out using items of delivery packaging which are arranged on pallets, meaning that it is also possible for multiple items of delivery packaging to be filled simultaneously or successively and to then be simultaneously outwardly transferred from the unit (1.4).

The then completed formulations can then, as described above, be drawn off from the buffer tank into disposable items of delivery packaging or reusable items of delivery packaging and then be, for example, received in the unit (2) via the receiving unit (2.2) and transferred to the unit (4) from the unit (2) via the storage-removal unit (2.3) for longer-term storage or directly shipped to a customer.

In the subunit (1.4), the produced intermediates and formulations are also marked. This marking is possible in different ways. For instance, devices for the labeling of delivery units and/or pallets can be present, to which identity data or identification data of the material to be drawn off are transmitted via a central electronic control unit for the entire system.

Said data, for example nature of the material, order number, container type and/or number of containers on a pallet, are processed in the devices for labeling and are used in the generation of a label for the delivery units and/or pallets used for drawing-off. Instead of labeling, other types of marking are also possible, for example the printing of a barcode. An actual labeling can then take place later, for example within the unit (4). Said labeling can then also take place when required, i.e., only upon shipment to a customer. The advantage of this is that, for example, transport-specific and/or customer-specific particularities can be realized in the creation of the label, which particularities were not yet known at the time of production.

A possible and preferred method of marking comprises the individual identification of delivery units and pallets, especially pallets. In this embodiment, the pallets used within the entire system thus have an individual identifier in each case, for example a barcode or an RFID transponder. An unambiguous assignment of drawn-off material and the pallet (and the delivery units arranged thereon) is achieved via a central electronic control unit for the entire system. The corresponding data are stored electronically. An actual labeling can then take place later, especially in the unit (4) when required.

Process

The present invention also provides a process for producing formulations and intermediates using the modular production system according to the invention.

Central features and designs of the process are already described above in the description of the production system. Moreover, the above-described particular designs and features with respect to the production system are also applicable in connection with the process according to the invention.

This means that the process according to the invention preferably comprises at least the following steps:
(1) transferring standardized loading units (sL), filled with input materials for the production of formulations and/or intermediates, from the holding subunit (2.1) to the provision subunit (2.4) using the means (M)
(2) docking the standardized loading units (sL) from (1) to the devices (V), withdrawing defined quantities of input materials present in the standardized loading units (sL), and transferring said quantities to the unit (1)
(3) producing and drawing off formulations and/or intermediates in the unit (1) with at least proportional use of the input materials from (2).

Further preferred process steps are immediately apparent from the above-described features of the production system.

For example, it is again preferred that the process comprises the following steps (1):
(1a) transferring standardized loading units (sL), filled with input materials for the production of formulations and/or intermediates, from the holding subunit (2.1) to the provision subunit (2.4) using the means (M)
(1b) transferring standardized loading units (sL), filled with input materials for the production of formulations and/or intermediates, from the holding subunit (2.1) to the pretreatment subunit (2.5) using the means (M), pretreating the input materials, and transferring the standardized loading units (sL), filled with pretreated input materials, from pretreatment subunit (2.5) to the provision subunit (2.4) using the means (M).

The process according to the invention likewise preferably comprises the following steps and/or sequences.

Using the subunit (1.1), the following sequence preferably takes place.

Batch-based manufacture of intermediates with proportional use of solid input materials, especially pigments and fillers, comprising
  transferring solid and fluid input materials to a process mixer in which there is a mixing device for the dispersion and mixing of solid and fluid input materials, with both solid and fluid input materials being transferred at least proportionally from standardized loading units (sL) by withdrawal of defined quantities using devices (V),
  producing intermediates by mixing the input materials in the process mixer,
  drawing off the intermediates into standardized loading units (sL) and transferring the filled loading units to the unit (2).

Using the subunit (1.2), the following sequence preferably takes place.

Manufacture of formulations and intermediates using fluid input materials and/or input materials which can be used as fluid input materials as a result of pretreatment, the manufacture of a formulation or of an intermediate comprising the following steps:
  transferring input materials to a process mixer in which there is a mixing device for the dispersion and mixing of fluid input materials, with the input materials being transferred at least proportionally from standardized loading units (sL) by withdrawal of defined quantities using devices (V),
  producing a first sub-batch of an intermediate or of a formulation by mixing the input materials in the process mixer,
  transferring the sub-batch to a buffer tank with mixing device via a fluid-conducting connection between process mixer and buffer tank,
  determining properties of the sub-batch before, during or after the transfer to the buffer tank by means of a measuring device,
  determining a deviation of properties of the sub-batch from the properties of a predefined target state by means of an evaluation unit,
  determining the adjusted quantities of input materials which, taking into account the deviations of the properties of the first sub-batch from the target state and taking into account the number and size of further sub-batches, are necessary for the setting of the target state of the total batch,
  producing at least one further sub-batch in the process mixer, the determined adjusted quantities being taken into account in at least one of the further sub-batches by means of adjustment of the feeding of input materials into the process mixer,
  transferring the at least one further sub-batch to the buffer tank for combination with the first sub-batch and mixing all sub-batches for the production of the total batch.

The adjusted quantities in the above-mentioned sense can evidently be positive or negative. A positive adjusted quantity means that overall a higher proportion of the particular input material must be used in order to achieve the target state. This can be achieved by a higher proportion of the input material in the production of at least one further sub-batch and/or by lower proportions of other input materials in the production of at least one further sub-batch. In the case of negative adjusted quantities, the actions are accordingly reversed.

It has become apparent that the following advantageous procedure can be carried out in connection with non-automated measurement of properties in the measuring device. Three sub-batches are produced overall, the first sub-batch and the second sub-batch being produced in the same manner. During the production of the second sub-batch, properties of the first sub-batch are measured and are evaluated with respect to deviations from the target state. Moreover, the adjusted quantities are determined. The production of the third sub-batch is then carried out taking into account the adjusted quantities. In this way, there is sufficient time for the material of the first sub-batch to be measured.

Using the subunit (1.3), the following sequence preferably takes place.

Continuous manufacture of colored and/or effect-giving formulations using fluid input materials and/or input materials which can be used as fluid input materials as a result of pretreatment, the manufacture of a formulation comprising the following steps:
  continuously transferring input materials into a small-volume process mixer (kP) in which there is a mixing device for the mixing of the input materials, with the input materials being transferred at least proportionally from standardized loading units (sL) by withdrawal of defined quantities using devices (V),
  continuously producing a formulation by mixing the input materials in the process mixer (kP) and transferring the formulation to a buffer tank with mixing device via a fluid-conducting connection between process mixer (kP) and buffer tank,
  determining properties of the continuously produced formulation by means of a measuring device,
  determining a deviation of properties of the continuously produced formulation from the properties of a predefined target state by means of an evaluation unit,
  determining the adjustment quantities of input materials which, taking into account the deviations of the properties of the continuously produced formulation from the target state and taking into account optionally the quantity of formulation quantity to be produced overall, are necessary for the setting of the target state of the total quantity, continuously producing further quantities of the formulation in the process mixer, the determined adjustment quantities being taken into account by means of adjustment of the feeding of input materials into the process mixer.

The adjustment quantities in the above-mentioned sense can evidently be positive or negative. A positive adjustment quantity means that overall a higher proportion of the particular input material must be used in order to achieve the target state for the formulation quantity to be produced overall. This can be achieved by a higher proportion of the input material in the continuous further production and/or by lower proportions of other input materials in the continuous further production. In the case of negative adjusted quantities, the actions are accordingly reversed.

The new modular production system and the unit (2) and also the process according to the invention make it possible to ensure an effective and semiautomated or fully automated organization of the handling of input materials and products that arise as piece goods. What is ensured is the feeding, holding and provision, removal from storage and optionally pretreatment of piece goods and loading units at the right place at the right time within a complex production system. In the context of specific configurations of the actual production unit (1), the advantages of the unit (2) become even more important, allowing a hugely effective production process in total—starting from the feeding of the input materials up to the removal of products from storage.

A further notable advantage of the modular production system is its capacity for successive extension or expansion. A system constructed as an initially local and comparatively small production site can be extended by addition of further zones (additional zones) which can be assigned to the individual units and subunits. Complete extension zones can be designed in different ways, depending on the given requirements. For example, a first extension zone can, with respect to the subunit (1), merely have additional zones which can be assigned to the subunits (1.1) and (1.4), since, for example, the demand for pigment pastes is particularly high. A second extension zone can, for example with respect to the subunit (1), merely have additional zones which can be assigned to the subunits (1.2) and (1.4), since, for example, the demand for clear intermediates has become particularly high. If said intermediates should then be directly forwarded to the subunit (1.3), it is also possible in said extension zone to dispense with a decided additional zone which can be assigned to the unit (4).

Figure 2:
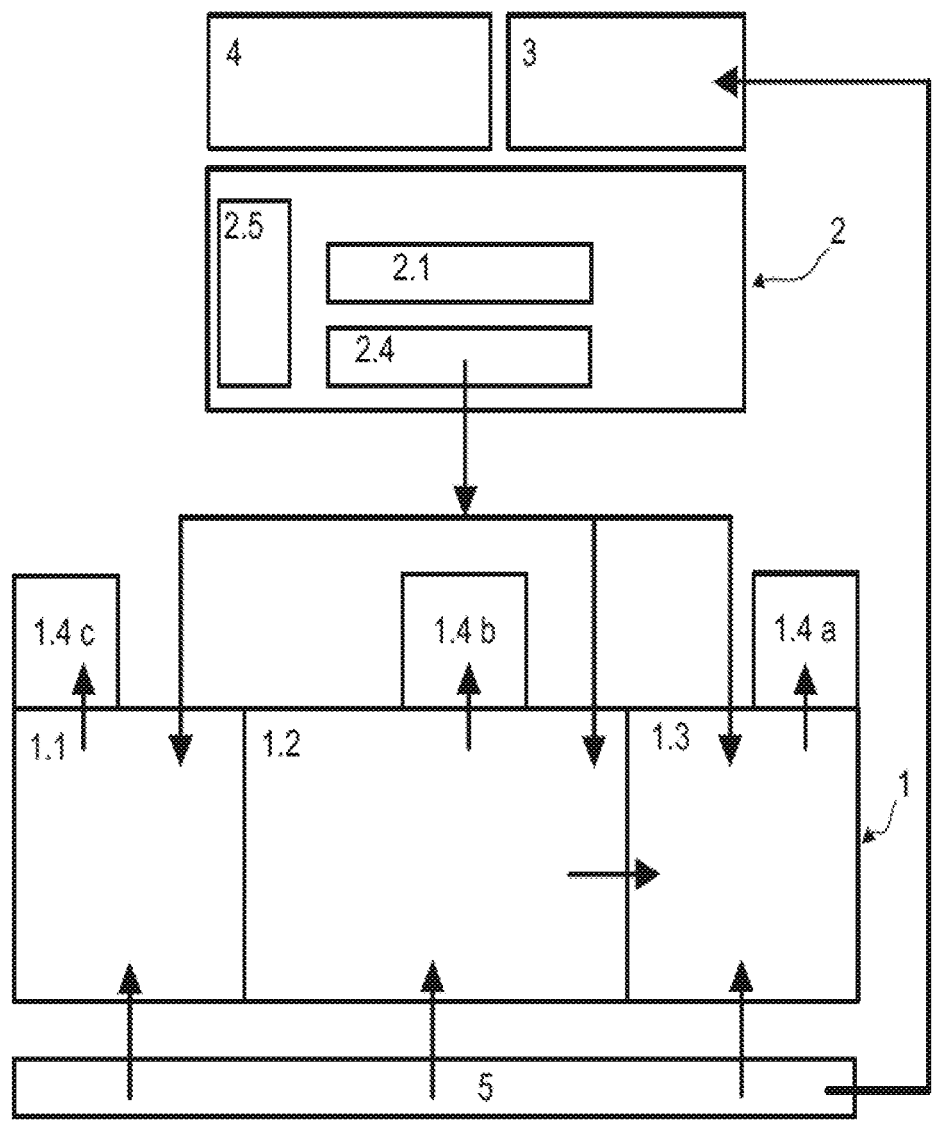
FIG. 2 is another schematic diagram of a production system.
Figure 3:
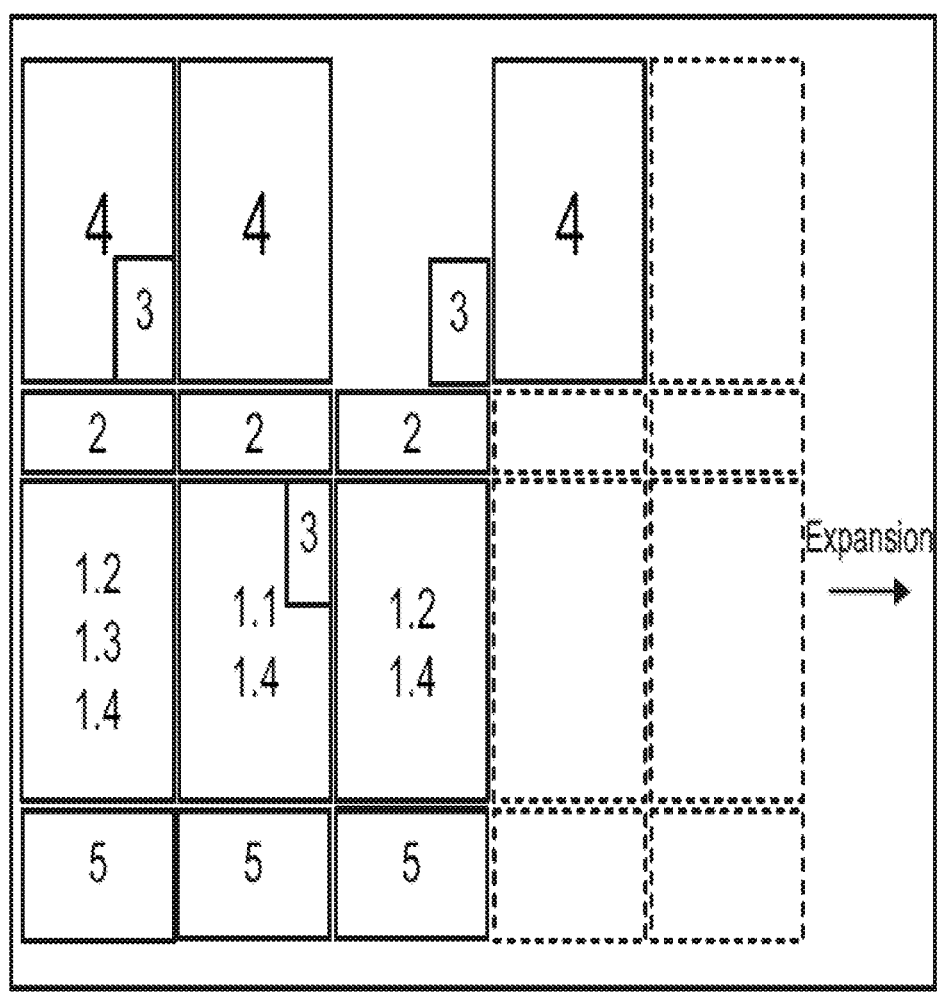
FIG. 3 is another schematic diagram of a production system.

The present invention, especially the production system according to the invention, shall additionally be more particularly elucidated with reference to the attached FIGS. 1 to 3.

FIG. 1: Production system according to the invention and movement of loading units FIG. 1 shows schematically a production system according to the invention, comprising the units (1) and (2) essential to the invention (including the preferably existent subunit (2.5)) and also the optional units (3), (4) and (5). For the sake of greater clarity, the subunit (1.4) has been depicted in three zones (in line with the above-given definition of module or unit or subunit, which definition ties in with the properties and the function of the units and not with the spatial arrangement). Moreover, the figure shows typical and preferably occurring movement sequences of loading units within the system, which movement sequences are depicted by means of arrows.

FIG. 2: Production system according to the invention and movement of materials (without loading units)

FIG. 2 likewise shows schematically a production system according to the invention. Moreover, the figure shows typical and preferably occurring movement sequences of input materials (raw materials and intermediates) and products (formulations) within the system, which movement sequences are depicted by means of arrows.

FIG. 3: Production system according to the invention with extension zones

FIG. 3 likewise shows schematically a production system according to the invention, showing in this case not only a first original zone of the production system, but also variably designed extension zones, the extension zones each comprising additional zones which can be assigned to the individual units and/or subunits of the entire system.

The invention claimed is:

1. A modular production system for formulations, the production system comprising:
   (1) a first unit for the production and drawing-off of formulations; and
   (2) a second unit coupled to the first unit (1) for receipt and removal from storage of piece goods (S) and loading units (L) and for the provision of piece goods (S), the second unit comprising:
     (2.1) a subunit for holding of empty loading units (L) and of loading units (L) filled with piece goods (S),
     (2.2) a receiving subunit for the receipt of the empty loading units (L) and of the loading units (L) filled with piece goods (S),
     (2.3) a storage-removal subunit for the removal from storage of the empty loading units (L) and of the loading units (L) filled with piece goods (S), and
     (2.4) a provision subunit for the provision of piece goods (S) for production of formulations, the provision subunit having devices (V), the devices (V) comprising:
       (V.1) first means for automated docking of standardized loading units (sL),
       (V.2) second means for automated withdrawal of defined quantities of piece goods (S) present in the standardized loading units (sL), and
       (V.3) third means for transfer of the defined quantities from the second means (V.2) to the first unit (1),
   the second unit (2) additionally comprising fourth means (M) for automated transport of loading units (L) within and between units and subunits of the production system and for automatedly transporting the standardized loading units (sL), held in the subunit (2.1) and filled with raw materials and intermediates, depending on current recipe requirements of the formulation to be produced or of an intermediate to be produced, to the provision subunit (2.4) in order to allow for feeding of the raw material or intermediate to the production system.

2. The modular production system as claimed in claim 1, wherein the first unit (1) comprises fifth means for production and drawing-off of formulations and intermediates.

3. The modular production system as claimed in claim 1, wherein the subunit (2.1) is set up for the holding of the empty loading units (L) and of the loading units (L) filled with piece goods (S), including at least (i) empty disposable items of delivery packaging and reusable items of delivery packaging,
(ii) disposable items of delivery packaging and reusable items of delivery packaging filled with formulations,
(iii) original containers filled with raw materials,
(iv) standardized loading units (sL) filled with raw materials,
(v) standardized loading units (sL) filled with intermediates, and
(vi) empty cleaned standardized loading units (sL).

4. The modular production system as claimed in claim 1, wherein the receiving subunit (2.2) is set up for the receipt of the empty loading units (L) and of the loading units (L) filled with piece goods (S), including at least
(i) empty disposable items of delivery packaging and reusable items of delivery packaging,
(ii) disposable items of delivery packaging and reusable items of delivery packaging filled with formulations,
(iii) original containers filled with raw materials,
(iv) standardized loading units (sL) filled with raw materials,
(v) standardized loading units (sL) filled with intermediates,
(vi) empty cleaned standardized loading units (sL), and
(vii) empty original containers.

5. The modular production system as claimed in claim 1, wherein the storage-removal subunit (2.3) is set up for the removal from storage of the empty loading units (L) and of the loading units filled with piece goods (S), including at least
(i) empty disposable items of delivery packaging and reusable items of delivery packaging,
(ii) disposable items of delivery packaging and reusable items of delivery packaging filled with formulations,
(iii) original containers filled with raw materials,
(vi) empty cleaned standardized loading units (sL),
(vii) empty original containers, and
(viii) empty soiled standardized loading units (sL).

6. The modular production system as claimed in claim 1, which further contains:
(i) empty disposable items of delivery packaging and reusable items of delivery packaging,
(ii) disposable items of delivery packaging and reusable items of delivery packaging filled with formulations,
(iii) original containers filled with raw materials,
(iv) standardized loading units (sL) filled with raw materials,
(v) standardized loading units (sL) filled with intermediates,
(vi) empty cleaned standardized loading units (sL),
(vii) empty original containers, and
(viii) empty soiled standardized loading units (sL).

7. The modular production system as claimed in claim 1, which additionally comprises a third unit (3), coupled to the second unit (2), for refilling of raw materials from original containers into the standardized loading units (sL).

8. The modular production system as claimed in claim 1, which additionally comprises a fourth unit (4) for the storage of the empty loading units (L) and of the loading units (L) filled with piece goods (S) and for the receipt and removal from storage of the empty loading units (L) and of the loading units (L) filled with piece goods (S) into and out of the modular production system.

9. The modular production system as claimed in claim 1, which additionally comprises a fifth unit (5) for storage of solid and/or fluid raw materials delivered as bulk good.

10. The modular production system as claimed in claim 9, wherein the first unit (1) comprises a first subunit (1.1) for production of intermediates with at least proportional use of solid input materials, the first subunit (1.1) comprising:
a. at least one process mixer,
b. at least one mixing device, arranged in the process mixer, for dispersion and mixing of solid and fluid input materials,
c. first means (X1) for transfer of solid input materials to the process mixer, the first means (X1) being connected to the third means (V.3) of the provision subunit (2.4),
d. second means (X2) for transfer of fluid input materials to the process mixer, the second means (X2) being connected to the third means (V.3) of the provision subunit (2.4) and the second means (X2) comprising at least one collection line for sequential, parallel, and/or partly parallel transfer of input materials to the process mixer, and
e. means for transfer of fluid input materials directly from large-volume receptacles from the fifth unit (5) to the collection line.

11. The modular production system as claimed in claim 9, wherein the first unit (1) comprises a second subunit (1.2) for production of formulations and intermediates using fluid input materials and/or input materials that can be used as fluid input materials as a result of pretreatment, the second subunit (1.2) comprising:
a. at least one combination of a process mixer and a buffer tank, with the process mixer and buffer tank containing mixing devices,
b. at least one fluid-conducting connection between the process mixer and buffer tank for transfer of sub-batches of formulations and intermediates, as produced in the process mixer, from the process mixer to the buffer tank,
c. third means (X3) for transfer of fluid input materials to the process mixer, the third means (X3) being connected to the third means (V.3) of the provision subunit (2.4) and the third means (X3) comprising at least one collection line for sequential, parallel, and/or partly parallel transfer of input materials to the process mixer,
d. means for transfer of fluid input materials directly from large-volume receptacles from the fifth unit (5) to the collection line,
e. at least one measuring device for determination of properties of a sub-batch of a fluid formulation or of a fluid intermediate, as produced in the process mixer,
f. at least one evaluation device, communicating with the at least one measuring device, for determination of a deviation of properties of sub-batches produced in the process mixer from properties of a predefined target state,
g. at least one adjustment device, communicating with the at least one evaluation device, for adjustment of feeding of input materials into the process mixer, which is set up to take into account the deviations of the properties of a produced sub-batch from the properties of the predefined target state and to take into account a number and size of further sub-batches in order to adjust fed quantities of input materials in the production of further sub-batches, and
h. at least one forwarding unit for the forwarding of intermediates from the buffer tank to at least one further production unit of the production system.

12. The modular production system as claimed in claim 1, wherein the second unit (2) additionally comprises a pretreatment subunit (2.5) for pretreatment of the piece goods (S) for the production of formulations.

13. The modular production system as claimed in claim 1, wherein the first unit (1) comprises a first subunit (1.1) for production of intermediates with at least proportional use of solid input materials, the first subunit (1.1) comprising:
 a. at least one process mixer,
 b. at least one mixing device, arranged in the process mixer, for dispersion and mixing of solid and fluid input materials,
 c. first means (X1) for transfer of solid input materials to the process mixer, the first means (X1) being connected to the third means (V.3) of the provision subunit (2.4), and
 d. second means (X2) for transfer of fluid input materials to the process mixer, the second means (X2) being connected to the third means (V.3) of the provision subunit (2.4) and the second means (X2) comprising at least one collection line for sequential, parallel, and/or partly parallel transfer of input materials to the process mixer.

14. The modular production system as claimed in claim 1, wherein the first unit (1) comprises a second subunit (1.2) for production of formulations and intermediates using fluid input materials and/or input materials that can be used as fluid input materials as a result of pretreatment, the second subunit (1.2) comprises:
 a. at least one combination of a process mixer and a buffer tank, with the process mixer and buffer tank containing mixing devices,
 b. at least one fluid-conducting connection between the process mixer and buffer tank for transfer of sub-batches of formulations and intermediates, as produced in the process mixer, from the process mixer to the buffer tank,
 c. third means (X3) for transfer of fluid input materials to the process mixer, the third means (X3) being connected to the third means (V.3) of the provision subunit (2.4) and the third means (X3) comprising at least one collection line for sequential, parallel, and/or partly parallel transfer of input materials to the process mixer,
 d. at least one measuring device for determination of properties of a sub-batch of a fluid formulation or of a fluid intermediate, as produced in the process mixer,
 e. at least one evaluation device, communicating with the at least one measuring device, for determination of a deviation of properties of sub-batches produced in the process mixer from properties of a predefined target state,
 f. at least one adjustment device, communicating with the at least one evaluation device, for adjustment of feeding of input materials into the process mixer, which is set up to take into account the deviations of the properties of a produced sub-batch from the properties of the predefined target state and to take into account a number and size of further sub-batches in order to adjust fed quantities of input materials in the production of further sub-batches, and
 g. at least one forwarding unit for the forwarding of intermediates from the buffer tank to at least one further production unit of the production system.

15. The modular production system as claimed in claim 14, wherein the first unit (1) comprises a third subunit (1.3) for continuous production of colored and/or effect-giving formulations using fluid input materials and/or input materials that can be used as fluid input materials as a result of pretreatment, the third subunit (1.3) comprising:
 a. at least one combination of a small-volume process mixer (kP) and a buffer tank, with the process mixer (kP) and buffer tank containing mixing devices,
 b. at least one fluid-conducting connection between the process mixer (kP) and buffer tank for the transfer of a formulation continuously produced in the process mixer from the process mixer to the buffer tank,
 c. fourth means (X4) for transfer of fluid intermediates containing coloring and/or effect-giving pigments and/or fillers to the process mixer (kP), the fourth means (X4) being connected to the third means (V.3) of the provision subunit (2.4),
 d. at least one fluid-conducting connection between the process mixer (kP) and the subunit (1.2) for transfer of fluid intermediates produced in the second subunit (1.2),
 e. at least one measuring device for determination of properties of a fluid formulation continuously produced in the process mixer (kP),
 f. at least one evaluation device, communicating with the at least one measuring device, for determination of a deviation of properties of the formulation continuously produced in the process mixer (kP) from properties of a predefined target state, and
 g. at least adjustment one device, communicating with the at least one evaluation device, for adjustment of feeding of input materials into the process mixer (kP), which is set up to take into account the deviations of the properties of a continuously produced subquantity of the formulation from the properties of the predefined target state in order to adjust the fed quantities of input materials in the continuous production of further subquantities.

16. The modular production system as claimed in claim 14, wherein the at least one forwarding unit is for the forwarding of intermediates from the buffer tank to a third subunit (1.3).

17. A process for producing formulations and intermediates using the modular production system as claimed in claim 1.

18. The process as claimed in claim 17, wherein the process comprises at least the following steps:
 (1) transferring the standardized loading units (sL), filled with input materials for production of formulations and/or intermediates, from the holding subunit (2.1) to the provision subunit (2.4) using the fourth means (M);
 (2) docking the standardized loading units (sL) from the first unit (1) to the devices (V), withdrawing defined quantities of input materials present in the standardized loading units (sL), and transferring said quantities to the first unit (1); and
 (3) producing and drawing off formulations and/or intermediates in the first unit (1) with at least proportional use of the input materials from the second unit (2).

* * * * *